US006814293B2

(12) United States Patent
Curry et al.

(10) Patent No.: US 6,814,293 B2
(45) Date of Patent: Nov. 9, 2004

(54) ARRANGEMENT FOR AND METHOD OF ESTABLISHING A LOGICAL RELATIONSHIP AMONG PERIPHERALS IN A WIRELESS LOCAL AREA NETWORK

(75) Inventors: Daniel Curry, Deer Park, NY (US); Ellen Oppenheim, Coram, NY (US); Michael Ryder, Moriches, NY (US); Robert Wild, Northport, NY (US); Bruce A. Willins, East Northport, NY (US); Alistair R. Hamilton, Stony Brook, NY (US); Raj Bridgelall, Mount Sinai, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 379 days.

(21) Appl. No.: 09/836,878

(22) Filed: Apr. 17, 2001

(65) Prior Publication Data

US 2002/0030094 A1 Mar. 14, 2002

Related U.S. Application Data

(60) Continuation-in-part of application No. 09/604,192, filed on Jun. 27, 2000, now Pat. No. 6,607,134, which is a continuation-in-part of application No. 09/539,689, filed on Mar. 31, 2000, now Pat. No. 6,216,951, which is a continuation-in-part of application No. 09/407,191, filed on Sep. 28, 1999, now Pat. No. 6,142,379, which is a continuation-in-part of application No. 08/895,888, filed on Jul. 17, 1997, now Pat. No. 6,145,746, which is a division of application No. 08/798,501, filed on Feb. 10, 1997, now Pat. No. 6,053,413.

(51) Int. Cl.$^7$ .................................................. G06K 7/10
(52) U.S. Cl. .............................. 235/472.01; 235/462.45
(58) Field of Search ....................... 235/472.01, 472.02, 235/462.13, 462.15, 467.07, 462.43, 462.44, 462.45, 462.47; 439/502, 620, 59, 65, 68

(56) References Cited

U.S. PATENT DOCUMENTS

| | | | | |
|---|---|---|---|---|
| 5,515,303 A | * | 5/1996 | Cargin et al. | ............... 361/683 |
| 5,563,402 A | * | 10/1996 | Reddersen et al. | ......... 235/436 |
| 5,675,138 A | * | 10/1997 | La | ........................ 235/462.44 |
| 5,744,788 A | * | 4/1998 | Metlitsky et al. | ........... 235/454 |
| 5,748,725 A | * | 5/1998 | Kubo | .................... 379/392.01 |
| 6,010,071 A | * | 1/2000 | Bard et al. | ............. 235/462.43 |
| 6,149,063 A | | 11/2000 | Reynolds et al. | |
| 6,499,243 B1 | * | 12/2002 | Herzog | ...................... 42/70.07 |

* cited by examiner

Primary Examiner—Karl D Frech
(74) Attorney, Agent, or Firm—Kirschstein, et al.

(57) ABSTRACT

A logical relationship is established among peripherals in a wireless local area network managed by a system manager. A readable identifier is associated with each peripheral. A reader for reading the identifiers is respectively associated with selected peripherals during a set-up mode of system operation. A transceiver is in wireless communication with the system manager for identifying the reader and the selected peripherals to advise the system manager of the establishment of the logical relationship.

18 Claims, 32 Drawing Sheets

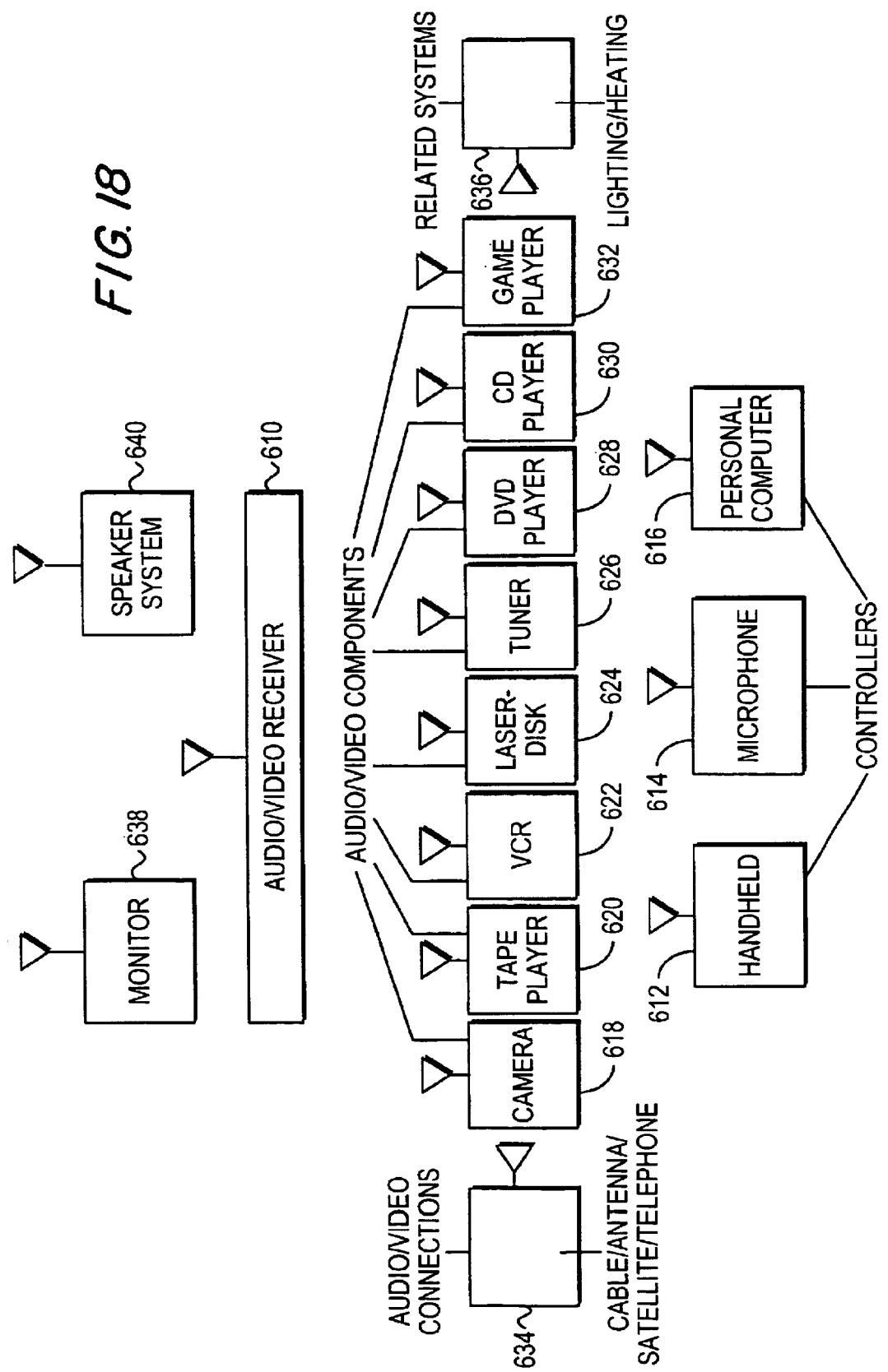

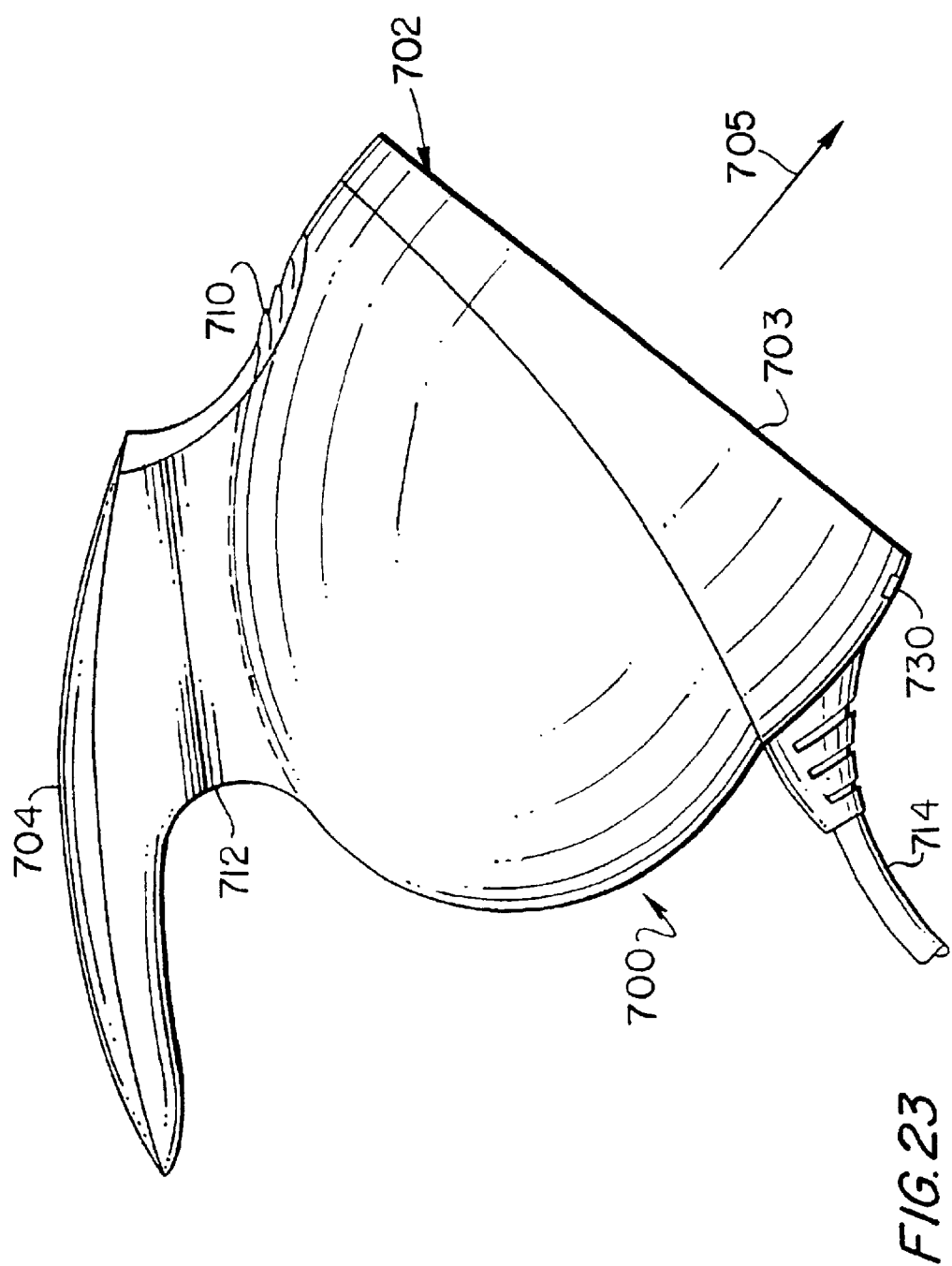

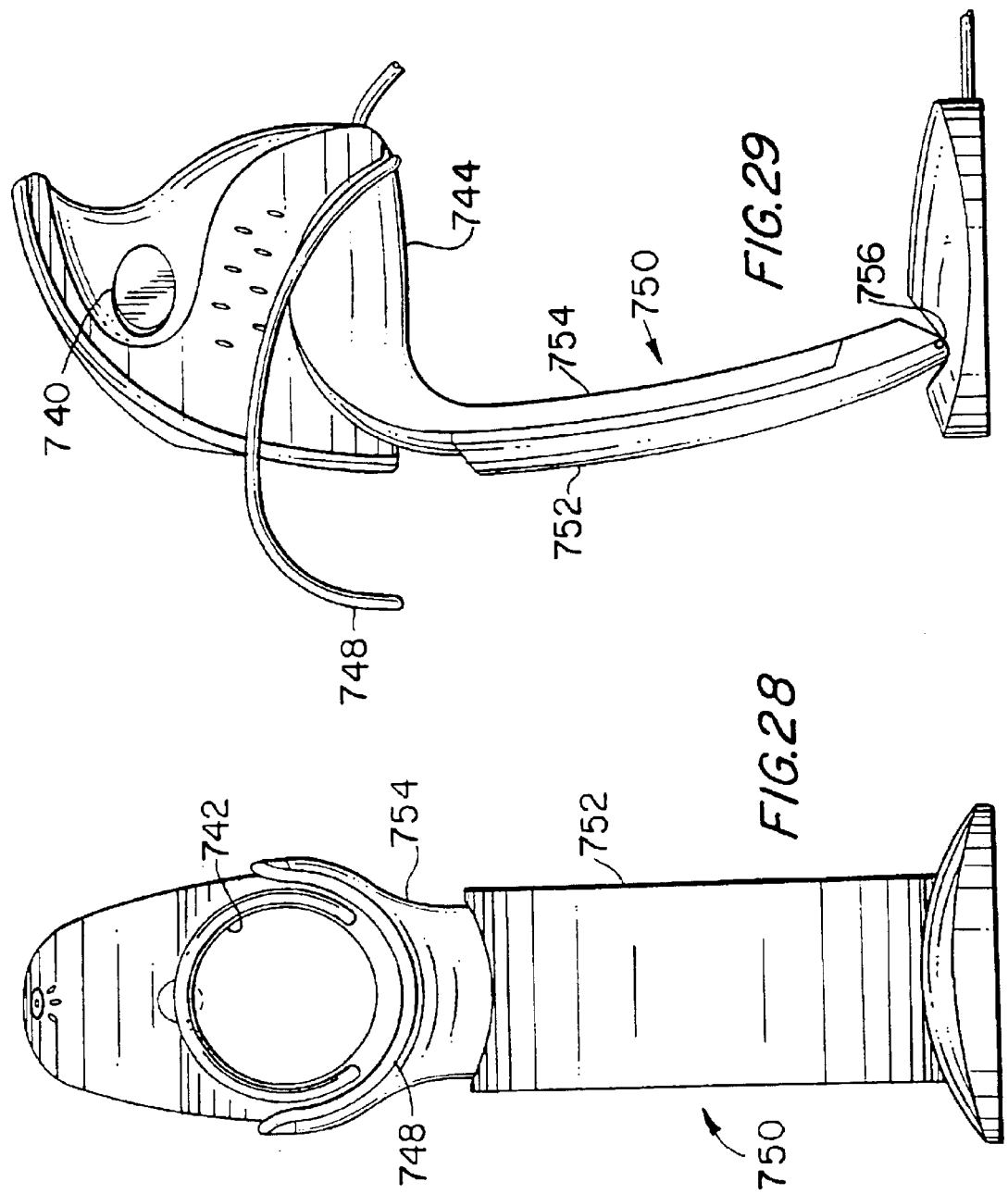

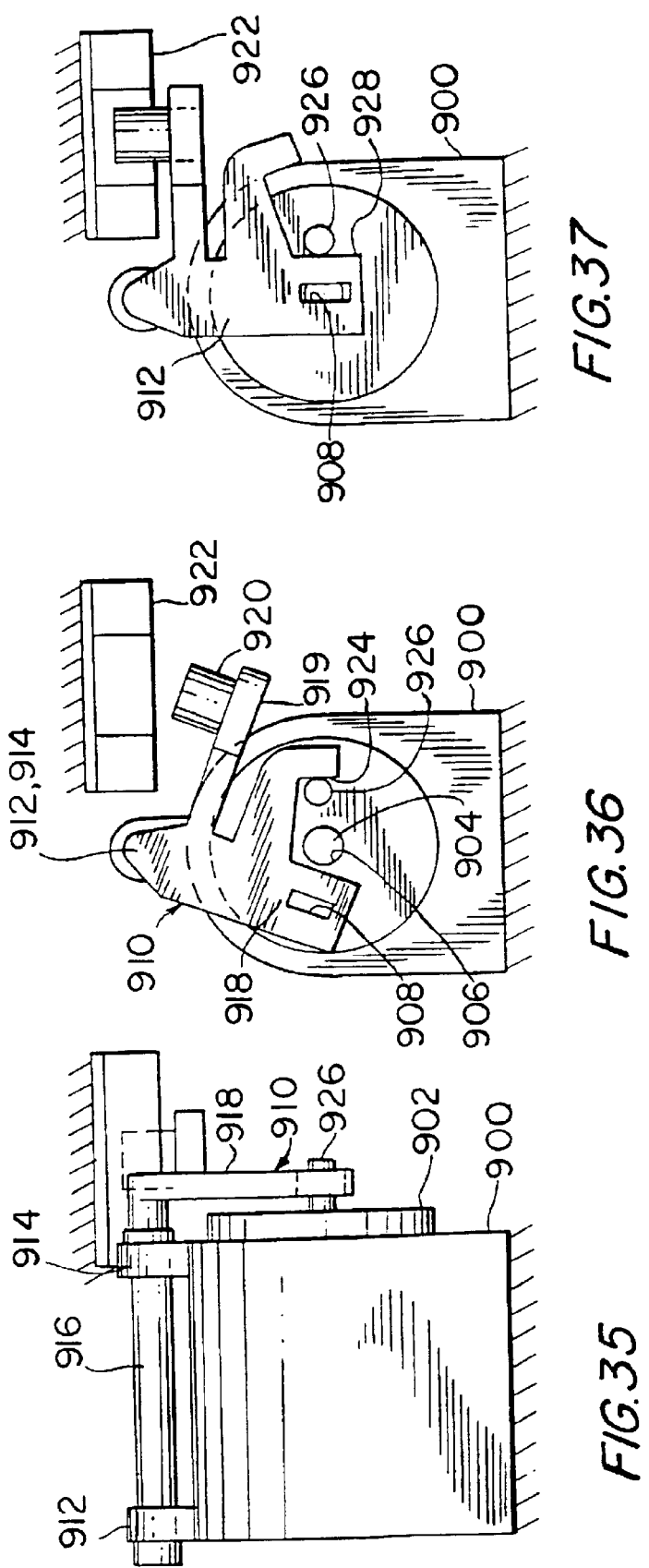

ARRANGEMENT FOR AND METHOD OF ESTABLISHING A LOGICAL RELATIONSHIP AMONG PERIPHERALS IN A WIRELESS LOCAL AREA NETWORK

CROSS-REFERENCE TO RELATED APPLICATIONS

This application is a continuation-in-part of U.S. patent application Ser. No. 09/604,192, filed Jun. 27, 2000, now U.S. Pat. No. 6,607,134 which is a continuation-in-part of U.S. patent application Ser. No. 08/895,888, filed Jul. 17, 1997, now U.S. Pat. No. 6,145,746, and is also a continuation-in-part of U.S. patent application Ser. No. 09/407,191, filed Sep. 28, 1999, now U.S. Pat. No. 6,142,379, and is also a continuation-in-part of U.S. patent application Ser. No. 09/539,689, filed Mar. 31, 2000, now U.S. Pat. No. 6,216,951, which is a division of U.S. patent application Ser. No. 08/798,501, filed Feb. 10, 1997, now U.S. Pat. No. 6,053,413.

This application is related to U.S. patent application Ser. No. 09/304,296, filed May 3, 1999, now abandoned and to U.S. patent application Ser. No. 09/711,850, filed Nov. 13, 2000.

BACKGROUND OF THE INVENTION

1. Field of the Invention

This invention generally relates to an arrangement for and a method of establishing a logical relationship among peripherals in a wireless local area network, the peripherals being in communication with one another and with a system manager for managing the network by a low power, wireless, radio frequency, communications protocol.

2. Description of the Related Art

Logical networks or virtual local area networks (LANs) are becoming increasingly important as LANs are interconnected with metropolitan or global networks which, in turn, have their own local area networks. In a physical local area network, all of the hosts in the LAN are physically connected to the same LAN cable or wire pair. In a logical network, a particular set of arbitrary hosts throughout the entire network is selected as a closed group. That is, hosts physically located in different local subnetworks may be logically connected as a single virtual LAN. This closed group is administered as a logical LAN independent of other groups of hosts. In the Internet, these logical LANs are referred to as logical IP subnets (LIS). Typically, a LIS requires manual configuration of each host by LAN administrators of each LAN where a logical LAN host is physically located.

U.S. Pat. No. 5,751,967 describes methods and apparatus for automatic configuration of switched networks implementing virtual local area networks (VLANs). Standard networking devices such as "concentrators" or "hubs" which have a plurality of ports for connecting to different types of network cables such as fiber optic cable, unshielded twisted pair cable and shielded twisted pair cable may be used in conjunction with software for creating the virtual network. Typically, such software code is executed at run-time in a single networking device and interacts with software for communication in other networking devices, although such features may be implemented in any variety of dedicated hardware devices in a networking device including, but not limited to, discrete logic circuits, large scale integrated circuits (VLSIs) or application-specific integrated circuits (ASICs).

The switched networking system may include a variety of technologies, for example, those employing either configuration-switched, frame-switched or cell-switched devices, any one or more of which can support the creation of VLANs.

Virtual auto-configuration (VAC) is a management tool implemented as a series of executable routines which are operative within a single device (e.g., NCE) in a switched networking system. Active within the device is a process known as the virtual auto-configuration daemon (VAC deamon) process which is responsible for managing all the VLAN devices in the switched inter-network via communication with software process resident in those devices. A virtual auto-configuration manager interacts with the daemon process wherein the network manager may set up various virtual local area networks in the switched inter-network by defining "policies" within manager processes. Policies are broadly defined as rules which specify how end-stations within the switched network should be grouped into VLANs. Policies are maintained using a policy configuration user interface which is resident within the VAC manager.

For example, a network manager may specify that all end-stations having predetermined media access control (MAC) addressed within a specified range are members of the same VLAN. Other policies may be defined based on any polled network data. Policies may be defined in any number of ways including, but not limited to, the use of a graphical user interface (GUI) using well-known techniques for creating tables with values/strings and other data times for populating tables specifying the policies. With communication with the VAC daemon process, a networks management station may also present a graphical display to the network manager of the virtual networks in the system. This may be done using any number of techniques, for example, a text list mapping VLANs to names or a graphical user interface displaying the physical configuration of the network (topology) and end-stations.

Such logical networks comprise, among other things, a plurality of components, devices, and other peripherals that cooperate and interact in a logical or working relationship. There may be multiples of each such peripheral, in which case, the identity of each such peripheral is critical for proper network operation.

One example of such multiple peripheral networks is an electro-optical reader for reading indicia such as bar code symbols appearing on a label or on a surface of an article. In its simplest form, the symbol itself is a coded pattern of indicia comprised of, for example, a series of bars of various widths spaced apart from one another to bound spaces of various widths, the bars and spaces having different light reflecting characteristics.

The scanning of bar code patterns has become more complex as bar code patterns have become both more complex and more compact. The typical bar code pattern includes lines and spaces of different widths extending in an x direction, and can be scanned by one or more linear scans in the x direction. Moreover, because the direction of the scan is not always precisely aligned with the direction of the bar code pattern, more complex omnidirectional scanning patterns are sometimes used, wherein consecutive scan lines are angularly displaced relative to one another to form a complex omnidirectional scanning pattern. Two dimensional (2D) bar code patterns (Code 49) have also been introduced wherein, in addition to a typical bar code pattern having lines and spaces of varying widths along an x direction, typical bar code patterns are stacked one upon the other in the y direction to form the 2D bar code pattern. Accordingly, scanning of a 2D bar code pattern is more complex, and requires a raster type of scan wherein consecutive x direction scans are displaced in the y direction by the spacing between stacked rows of the 2D bar code pattern to form a raster scan.

The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been commonly assigned to the same assignee as the present application.

As disclosed in some of the above patents, one embodiment of such a scanning system resides, inter alia, in a portable laser scanner which is grasped and hand-held by a user, which is designed to allow the user to aim the scanner, and more particularly, a light beam emanating therefrom, at a target bar code symbol to be read.

In prior art bar code scanners, the light source in a laser scanner is typically a gas laser or semiconductor laser. The use of a semiconductor device such as a laser diode as the light source in scanning systems is especially desirable because of its small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or symbology used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of this discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row individually. Likewise, the multiple-scan-line readers produce a number of scan lines at an angle to one another so these are not suitable for recognizing a Code 49 type of two-dimensional symbols.

In the scanning systems known in the prior art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected by the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol and to the alphanumeric characters represented thereby.

The decoding process in known scanning system usually works in the following manner. The decoder receives the pulse width modulated digital signal from the scanner, and an algorithm implemented in software attempts to decode the scan. If the start and stop characters and the characters between them in the scan are decoded successfully and completely, the decoding process terminates and an indicator of a successful read (such as a green light and/or an audible beep) is provided to the user. Otherwise the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader incorporates detectors based upon charge coupled device (CCD) technology. In such readers, the size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to be properly read. Such physical contact of the reader with the symbol is a preferred mode of operation for some applications, or is a matter of personal preference by the user.

Such scanning systems may comprise peripherals which are physically separate from one another, and which work together. For example, the light source and the detector may be mounted in discrete housings. A keyboard, a display, a power pack and a controller may also be mounted in separate housings. In some applications, a user must select one from among many light sources, detectors, keyboards, displays, power packs, or controllers. A system manager for the network must be apprised of exactly which of the peripherals have been selected to work together in a particular operating network.

SUMMARY OF THE INVENTION

OBJECTS OF THE INVENTION

Accordingly, it is a primary object of the present invention to establish a logical or working relationship among peripherals in a wireless local area network managed by a system manager.

FEATURES OF THE INVENTION

In keeping with this object, one feature of this invention resides, briefly stated, in an arrangement for and a method of establishing a logical relationship among peripherals in a wireless local area network managed by a system manager. A readable identifier is associated with each peripheral. A reader for reading the identifiers is respectively associated with selected peripherals during a set-up mode of system operation. The reader has a transceiver in wireless communication with the system manager for identifying the reader and the selected peripherals to advise the system manager of the establishment of the logical relationship. In a preferred embodiment, the reader includes a radio frequency transmitter for transmitting the identifiers at radio frequency to the system manager.

In one embodiment, the identifiers are indicia having parts of different light reflectivity, such as bar code symbols, in which case, the reader includes a scanner for electro-optically reading the indicia. In another embodiment, the identifiers are radio frequency transmitters that transmit an identifying signal, in which case, the reader is a receiver for receiving the identifying signal.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 18 is another embodiment of a wireless local area network employed in a home entertainment system;

FIG. 23 is a side view of a modified spherical or ovoid hand-held optical scanner;

FIGS. 28 and 29 are respectively front and side views of an alternative hand-held scanner in place in its cradle;

FIG. 35 is a side view of a mechanism for changing the laser aperture;

FIG. 36 is a front view of the mechanism shown in FIG. 35, with the alternative aperture retracted;

FIG. 37 corresponds to FIG. 36, but shows the alternative aperture in place;

DETAILED DESCRIPTION OF THE PREFERRED EMBODIMENTS

Figure 1A:
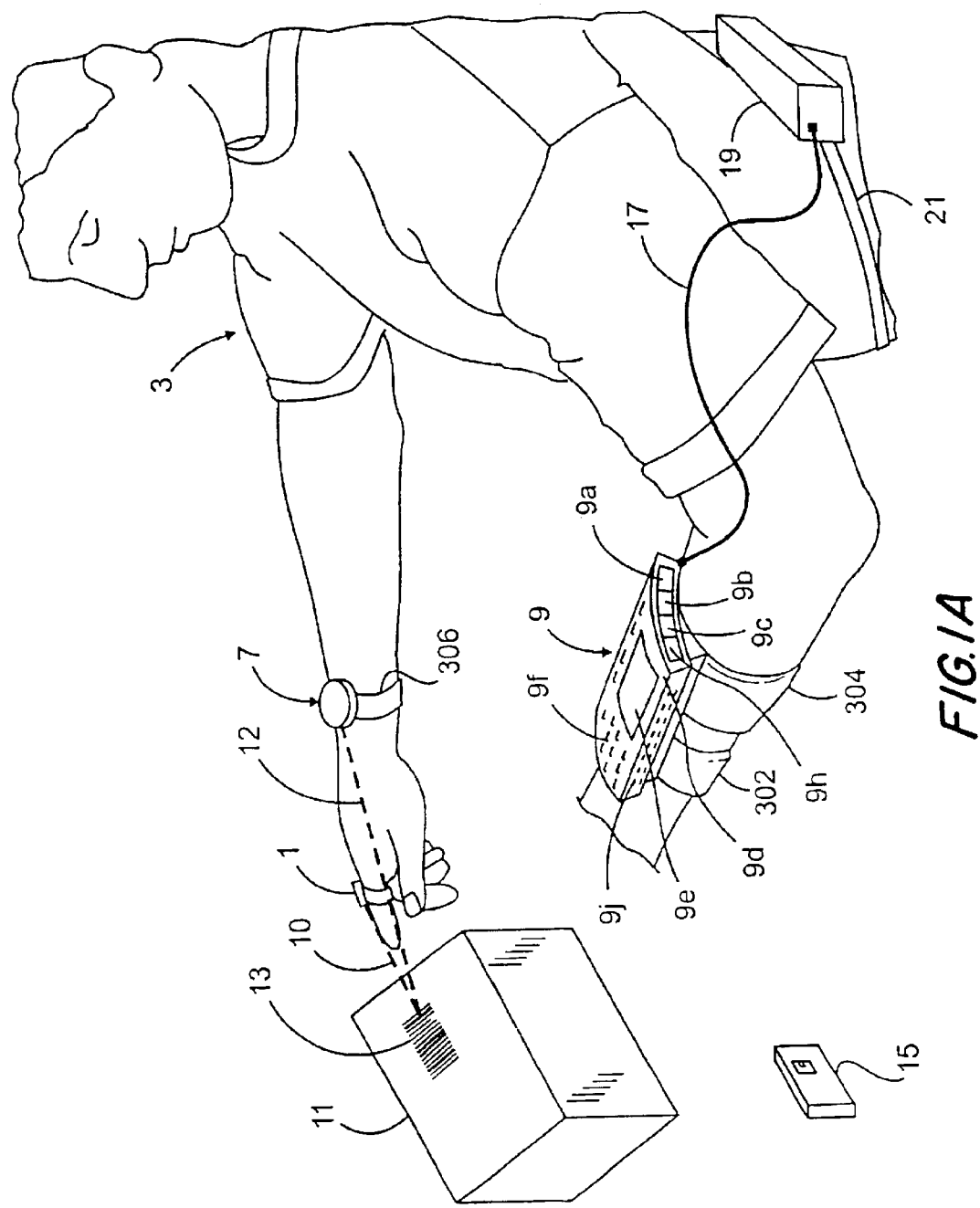
FIGS. 1A and 1B depict a portable system in accordance with a first embodiment of the present invention.

FIG. 1A shows a portable system in accordance with a first embodiment of the present invention. An optical scan module or main peripheral 1 is detachably mounted on a single finger of a user 3 using a ring-shaped mounting. The detachable mounting may be of any number of conventional types suitably adapted for its ease of use for the desired application. For example, a ball and flexible socket mounting, or a slide mounting could be used. Other mountings with movable restraining members might also be used.

In addition to the optical scan module 1, the user 3 wears a first peripheral module 7 on the wrist, and a second peripheral module 9 on the other arm. As will be clear from FIG. 1A, the scan module 1 emits a scanning laser beam 10 which the user directs towards a bar code symbol 13 to be read. The bar code symbol may be printed on or otherwise attached to an article 11, details of which the user 3 wishes to obtain, for example, for inventory or for sale purposes. The scanning beam 10 is reflected from the bar code symbol 13, and the reflected light 12 is detected by the first peripheral module 7.

Figure 1B:
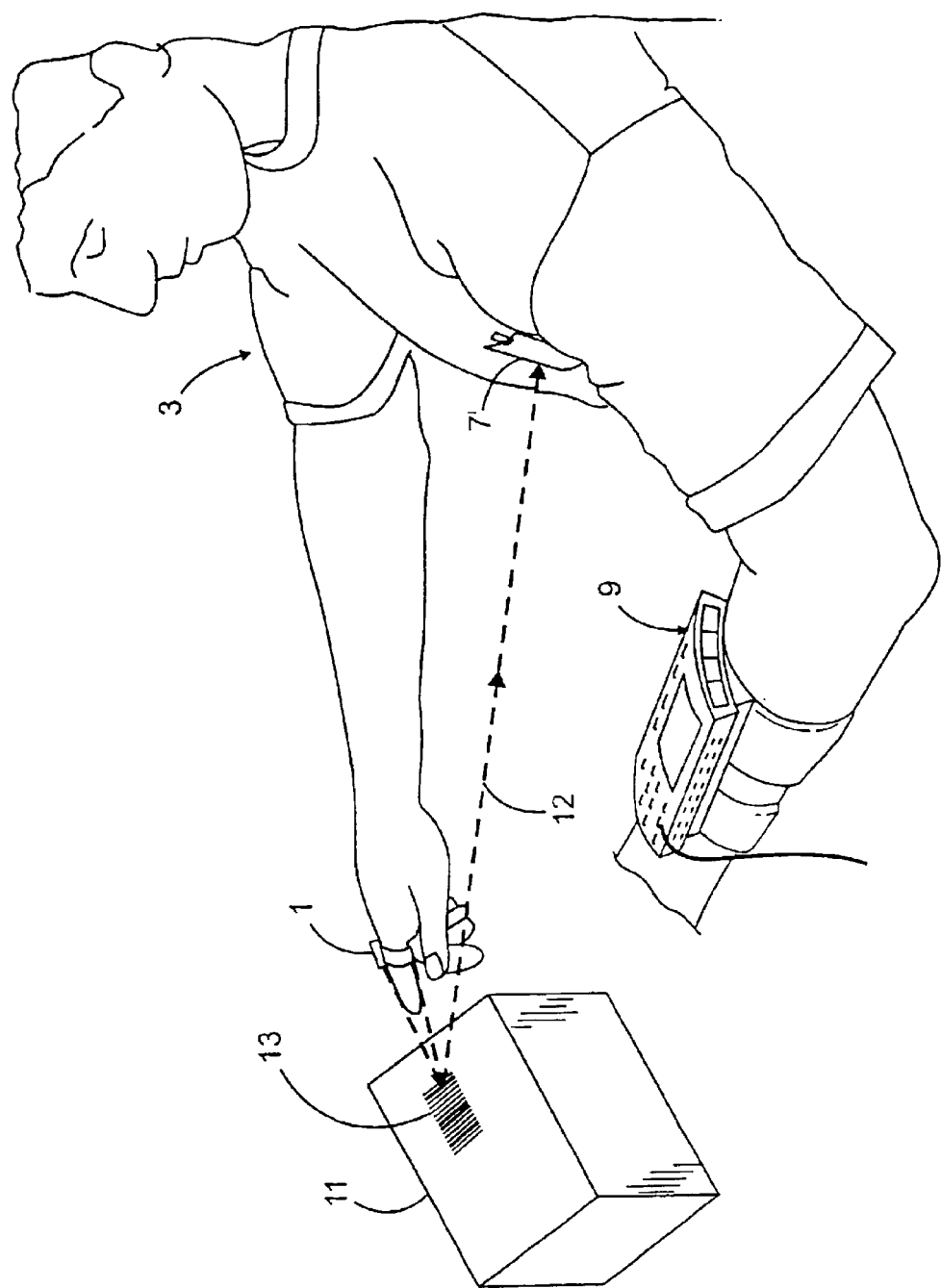

FIG. 1B illustrates a variant of the embodiment of FIG. 1A in which the reflected light 12 returning from the bar code symbol 13 is detected by a peripheral module 7' which is secured to the user's clothing. In the variant shown, the peripheral module comprises a detector which is clipped on to the breast pocket of the user's shirt or shift. Other arrangements (not shown) could of course be envisaged, in which the peripheral module 7' is secured to or forms part of other articles of clothing.

Figure 2:
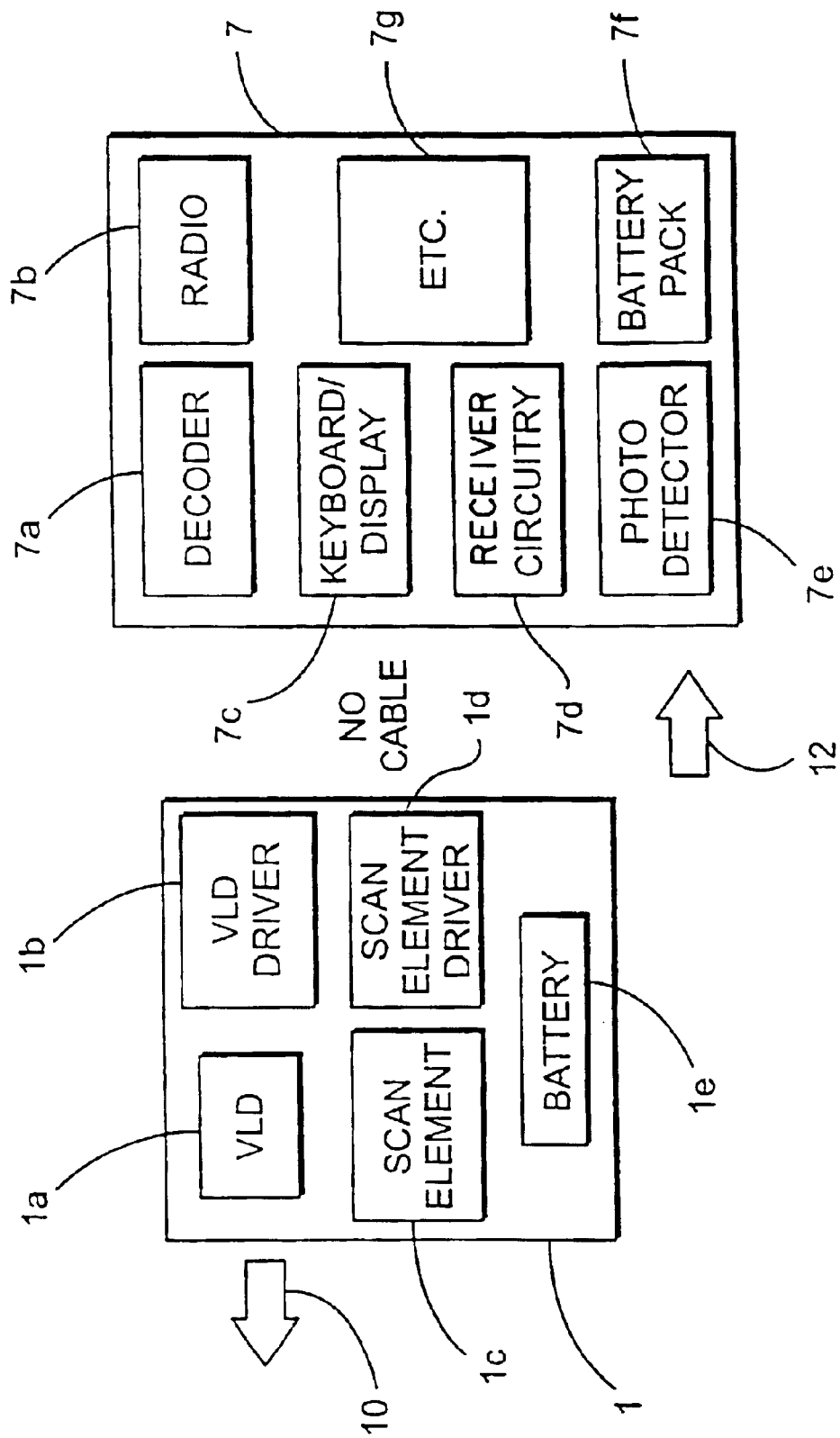
FIG. 2 illustrates schematically the ring unit and the wrist unit shown in FIGS. 1A and 1B.

FIG. 2 illustrates schematically the internal features of the scan module 1 and the first peripheral module 7. The module 1 incorporates a device for generating and scanning the light beam 10, desirably a visible laser diode (VLD) 1a having a driver 1b. Scanning of the beam 10 is achieved by means of a scan element 1c and a scan element driver 1d. Power is provided by means of a small battery 1e.

The first peripheral module 7 comprises a photodetector 7e and receiver circuitry 7d which are together arranged to detect the returning light beam 12. The output from the receiver circuitry is passed to a decoder 7a which is arranged to reconstitute the alphanumeric information which the bar code symbol 13 represents. The first peripheral module may also include a keyboard and/or display 7c along with a radio frequency transponder for transmitting an identifying signal, and other possible features 7g such as, for example, a time display so that the module 7 doubles as an ordinary watch when it is not in use as part of the optical scan system. A radio frequency (RF) or other wireless transmitter 7b, along with a battery pack 7f or other power supply, completes the unit.

In use, the decoded information emanating from the decoder 7a is passed by wireless link from the radio 7b to the second peripheral module 9 which is located on the other arm or wrist of the user. The radio transmitter 7b could be a transceiver which is also capable of receiving signals from the second peripheral module 9 or from a separate base station 15.

The second peripheral module 9 incorporates a radio receiver 9a and a radio transmitter 9b for communicating with the first module 7 and/or with the base unit 15. Typically, the respective transmission frequencies will be different. The second peripheral module 9 further includes digitizing and processing circuits 9c which convert the transmitted analog signal to a digital signal and decode the signal in a conventional manner. An indicator light, beeper or audio transducer 9d signals the user when the decoding has been satisfactorily accomplished. Such notice could also or alternatively be provided by information displayed on a display unit 9e. A memory storage device 9h is also preferably included for temporary storage of the decoded data. A keypad 9f and/or touch screen may be used for inputting data to the system. A battery 9j is provided to supply power to the secondary peripheral module. Alternatively, or in addition, power may be supplied via an external lead 17 from a separate power supply 19 which is secured to the body of the user, for example on a belt 21.

Depending upon the preference of the user, the second peripheral module could be worn on the right arm, or wrist, like a watch (and in fact, may function as a watch) and the optical scan module 1 and the first peripheral module on the left. In an alternative embodiment (not shown) the second peripheral module 9 could be dispensed with, and all the features of that unit instead being incorporated within the first peripheral module 7. This would, of course, be expected to make the first peripheral module rather larger than is shown in the drawing.

It will be noted that in the arrangement shown in FIGS. 1A and 1B, there is no cable or other physical connection between the optical scan module 1 and either of the first or second peripheral modules. This improves the wearability of the system, and the likely user acceptance. It is also rather safer, since the lack of wires means that there is less to get caught as the user moves around, perhaps undertaking a variety of different tasks while wearing the devices shown.

In a variation of the embodiment described above, the scan element 1c and the scan element driver 1d may be omitted from the optical scan module 1, so that the beam 10 is essentially a fixed beam. With such an arrangement, the user would then physically move his or her hand or arm, thereby manually scanning the beam 10 across the bar code symbol 13. Such an arrangement has the advantage that the module 1 can be reduced in size and in weight, not only by elimination of the mechanical and electronic scanning features, but also because the battery 1e may substantially be reduced in size. A suitable module for use with this variation is described in more detail below.

Figure 3:
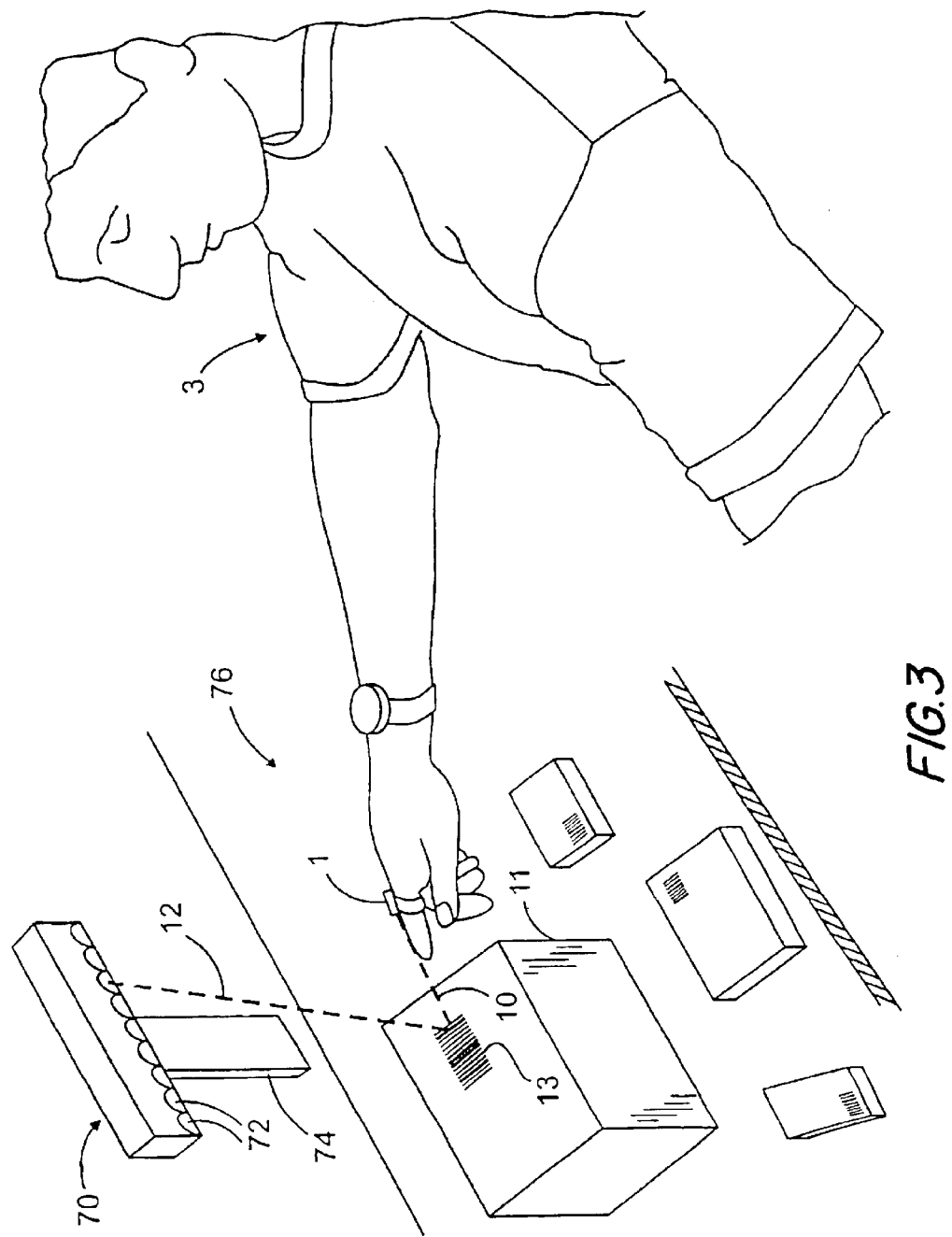
FIG. 3 depicts a portable system in accordance with a second embodiment of the present invention.

A second embodiment of the invention is shown schematically in FIG. 3. In this embodiment, the light 12 which is reflected from the bar code symbol 13 is detected by a separate detector unit 70 which comprises a fixed bank of photodetectors 72 which look down on the surface of the article 11 so as to detect the reflected light. The detector unit could be mounted to a stand 74 which is positioned adjacent a conveyor 76 along which the item 11 is passing. Alternatively, the detector unit 70 could be mounted in or secured to a cash register, could be mounted to the ceiling, or may be suspended from the ceiling by a cable similar to a hanging lamp, or could be mounted within a tunnel which surrounds or at least partially surrounds the conveyor.

In this embodiment, the optical scan module 1 is preferably the same as the scan module illustrated in FIGS. 1A, 1B and 2, with or without the scan element 1c and the scan element driver 1d. If these are not provided within the module, the user has to manually scan the beam 10 across the bar code symbol 13 to be read. As a further alternative (not shown) a hand held scanner could instead be used, but in each case the detectors are fixedly mounted over the scanned surface.

Figure 3A:
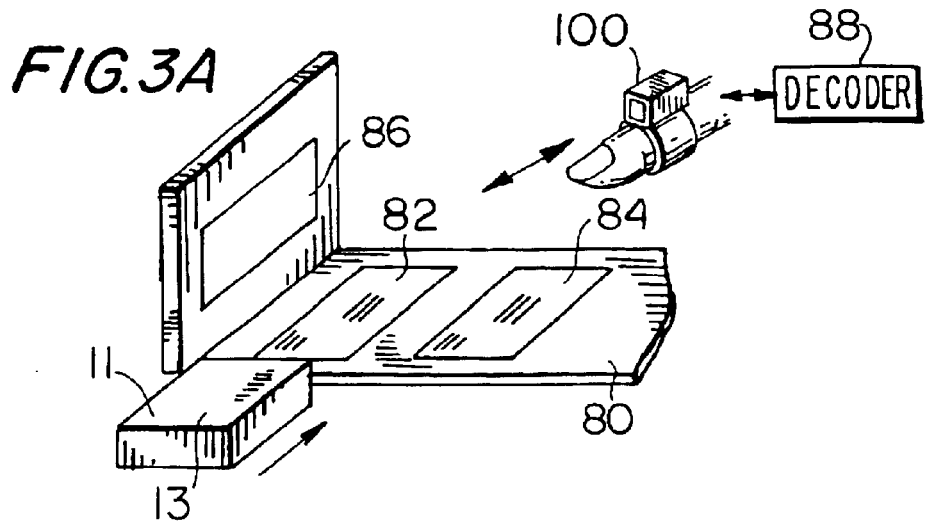
FIG. 3A depicts another system in accordance with the present invention.

FIG. 3A depicts a so-called "slot" scanner built into a horizontal counter 80. A modem grocery store checkout counter typically includes a cash register that is used to check out merchandise items 11 bearing bar code symbols 13. A cashier removes items from a movable conveyor belt, one at a time, drags them across a window built into the counter, and places them on a shopping carrier, such as a cart. A fixed scanner directs a laser beam through the window. The scanner of FIG. 3A is depicted with a plurality of windows 82, 84 lying in a horizontal plane, and a window 86 lying in a vertical plane. The ring 100 supported on the cashier's finger is in radio frequency communication with a decoder 88.

In use, the symbol 13 on item 11 can be scanned by a laser beam passing through any one of the windows, or by a plurality of laser beams passing through a plurality of the windows, or by a laser beam passing through one of the windows in concert with a light beam emitted by the ring 100. No matter whether the ring serves as a light source, or as a light detector, the ring transmits digitized data indicative of the symbol to the decoder 88 which, in turn, is linked with a processor to translate the symbol, for example, directly into a cash register entry including the price of the scanned item and/or a brief description of the item, or indirectly as an input to a look-up table, for example, in disk storage, from which information relating to the symbol is obtained.

Figure 4:
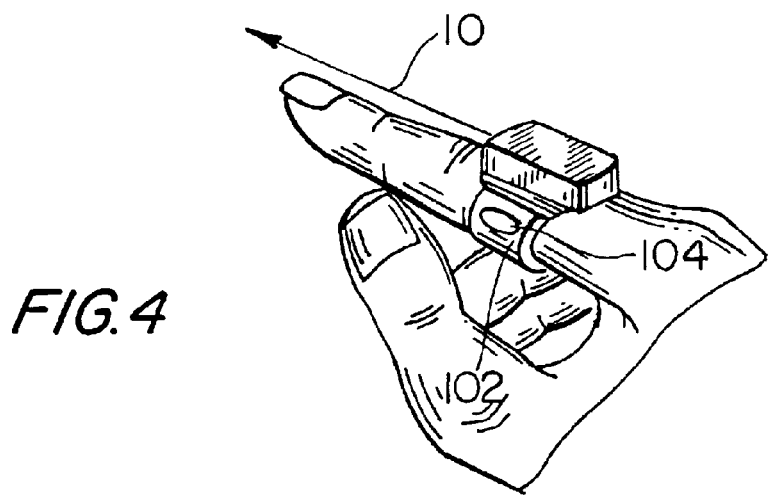
FIGS. 4 and 5 illustrate triggering mechanisms which may be used with the systems of FIGS. 1A, 1B, 2 or 3.
Figure 5:
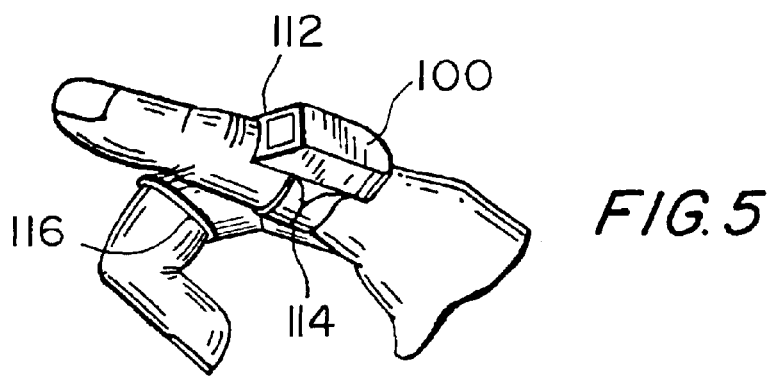

Reference should now be made to FIGS. 4 and 5 which illustrate certain preferred features of a ring-mounted reader. The reader comprises a ring or shank portion 102, adapted to be worn on the finger of the user, to which is secured an upper housing portion 100. Within the housing portion is a battery which provides power to a visible laser diode (VLD) or other light source. The VLD is mounted to a metal holder/heat sink. Light generated from the VLD passes through an optical system comprising a plurality of lenses, out through an exit window 112. The optical system preferably provides that the beam 10 is collimated or at least quasi-collimated. Electronic circuitry is provided which maintains the laser output at a predetermined level, and also acts as a trigger mechanism.

A trigger button 104 is provided on one side of the ring shank 102, where it can be actuated by the user's thumb. In this way, the user can easily switch the laser beam on and off, or actuate the scanning.

Another alternative and/or additional switching mechanism may be provided by means of a separate ring 116 which is attached to the user's middle finger and which is secured to the ring shank 102 by means of a cord 114. As is shown in FIG. 5, the user may operate the device by flexing the middle finger, and so pulling on the cord. This could be done either by bending the middle finger with respect to the index finger, or by pulling the middle finger away from the index finger.

A device of this sort is both easy and convenient for the user to wear, and it also allows free use of the hand at all times. Because the ring is preferably mounted to the index or forefinger, pointing accuracy is likely to be increased.

An alternative and/or additional switching mechanism may be provided by the use of a limited range proximity sensor located on the front or side surface of the ring shank 102. When the user wishes to turn the unit on, a slight movement of the thumb closer to the index finger will switch the unit on, thus avoiding the effort required for the thumb to press a trigger switch.

Batteries for wearable devices of the types which have already been described typically occupy a significant proportion of the device's volume, and additionally contribute to its weight. Where substantial power is required, such as for example the devices illustrated in FIGS. 1–5, a separate battery pack 19 is often the most convenient way to provide the power that is needed. However, in a variation of the embodiments previously described, power may instead or in addition be provided by a thin flexible battery which forms part of the band that wraps around the arm, wrist or finger of the user. Specifically, in FIG. 1A the wrist band 306 could be such a battery, as could be the arm bands 302, 304. In FIG. 5, the ring shank 102 could be a battery.

Preferably, the battery is of the lithium polymer rechargeable type, which is simply cut into the appropriate shape. Such batteries may provide sufficient power, on their own, for operation of some devices; in other cases, they may be used as an auxiliary battery, thereby reducing the size of the additional cells that may be necessary.

Figure 6:
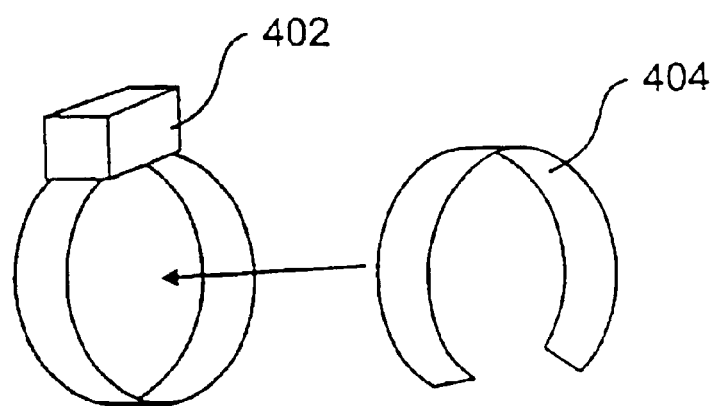
FIG. 6 shows schematically yet a further embodiment in which a band for securing a scanner to the user's body comprises a flexible battery.

FIG. 6 illustrates the concept in schematic form. A flexible battery strip 404, preferably a lithium polymer battery, is formed into a ring shape and is attached to a scanner 402. Depending upon the size of the device, the band 404 may fit around a finger, a wrist or an arm of the user.

Figure 7:
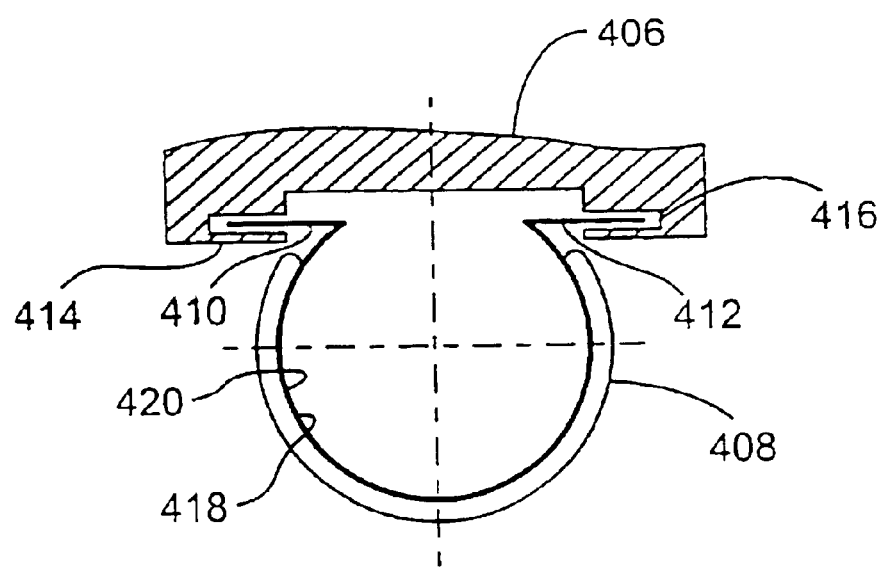
FIG. 7 represents a practical embodiment of the device shown in FIG. 6.

FIG. 7 illustrates a practical embodiment in more detail. A flexible battery strip 408 is attached to two circularly-shaped snap springs 418, 420. One snap spring 418 is attached to the positive battery terminal, and the other 420 to the negative battery terminal. At one end of the spring 418 there is a contact portion 410, while at the opposite end of the other spring 420 there is a similar contact portion 412. These fit into corresponding grooves 414, 416 in the lower surface of the scanner 406, thereby providing the necessary electrical power.

The exact shape and configuration of the battery and the contacts is not of course critical. In the embodiment shown in FIG. 7, the springs 418, 420 could be in the form of thin, sprung wires. Alternatively, they could take the form of flat leaf springs, which extend out of the plane of the figure. In the first case, the scanner 406 is provided with sockets 414, 416 in the form of blind bores which receive the contact portions 410, 412. Alternatively, where the springs take the form of leaf springs, the contact portions 410, 412 may simply be slid into appropriate grooves 414, 416 in a direction perpendicular to the plane of the figure. In either case, the snap springs 418, 412 are preferably incorporated within the plastic protective jacket of the battery during the manufacturing process.

To make it easier to put the device on and to take it off, an alternative embodiment (not shown) provides for one end of the battery to be hinged to the underside of the scanner. The other end is secured by an easily-releasable clasp. To put the device on, or to take it off, the user merely releases the clasp and hinges the battery away from the underside of the scanner.

Figure 7A:
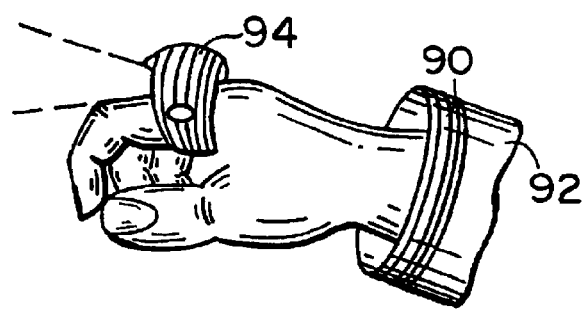
FIG. 7A represents an embodiment that eliminates the use of batteries.

Wearable devices, such as ring scanners, with wireless connectivity use a battery for local energy storage. To reduce the bulk of the ring scanner, it is proposed to replace the battery with a capacitor that can be inductively charged. As shown in FIG. 7A, the wall 94 of the ring scanner housing can be made of a capacitor material, or conductive plates can be coated with a dielectric and then molded over with plastic, or several capacitive cells can be distributed throughout and embedded in the housing. A radio frequency coil 90 is integrated in the user's clothing, for example, on a belt, or in a pocket of an apron, or, as shown in FIG. 7A, the coil may be weaved into a sleeve 92 of the user's uniform using conductive threads. Power transfer is implemented by radio frequency induction between the coil and capacitor.

Assuming that each reading of a symbol requires a duration of about 1.13 seconds, then a scanner required to scan about 200 scans per hour will have a duty cycle of about 6.5%. For a higher duty cycle, the power consumption in the ring scanner must be decreased. This is achieved by having the on-board circuitry only consist of those components that are required to transmit the light beam and to detect the received light. In order to maintain maximum power transfer, the transmitting coil must match its resonant frequency to that of the capacitor. A controller may be used to dynamically set the resonant frequency.

Figure 8:
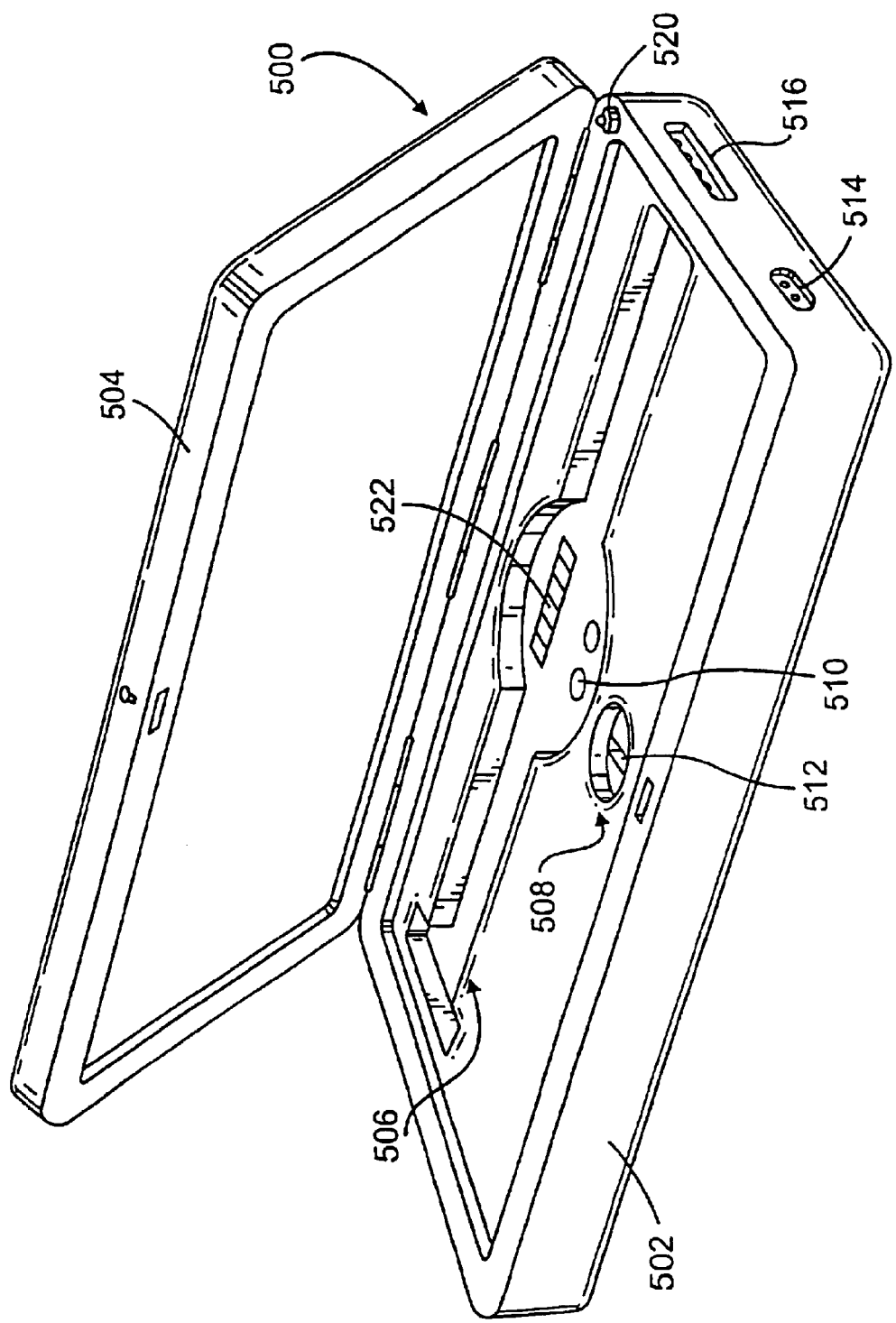
FIG. 8 shows a storage box for use with the portable optical scan system of FIGS. 1A, 1B.

FIG. 8 shows a storage box 500 which is suitable for use with the system shown in FIG. 1A. The box comprises a base portion 502 and a lockable hinged lid portion 504. Within the base portion 502 there is a first recess 506 for storing the watch 7 (FIG. 1A) and a second recess 508 for storing the ring 1 (also FIG. 1A). In addition to providing convenient and secure storage, the box 500 incorporates a battery charger (not shown) to recharge any battery that may be incorporated within the watch 7 and/or the ring 1. To that end, when the watch is placed within the recess 506, its rear surface comes into contact with electrodes 510. Likewise, when the ring is placed in the recess 508, with the band portion pushed down into a slot 512, it comes into contact with further electrodes (not shown). Power is provided to these electrodes via a mains supply which is plugged into a socket 514 on the outside of the box. The electrodes become live, thereby recharging the batteries (for example, overnight) when the lid 504 is closed, thereby closing a microswitch 520.

In some embodiments, the watch 7 of FIG. 1A may be used to store data, and may accordingly have a memory chip inside it. When the watch is placed in the recess 506, an electrical contact on its rear surface abuts a corresponding contact 522 at the base of the recess. The data within the watch may then automatically be downloaded, or downloaded on request, via a data socket 516 to an external computer (not shown).

Figure 9:
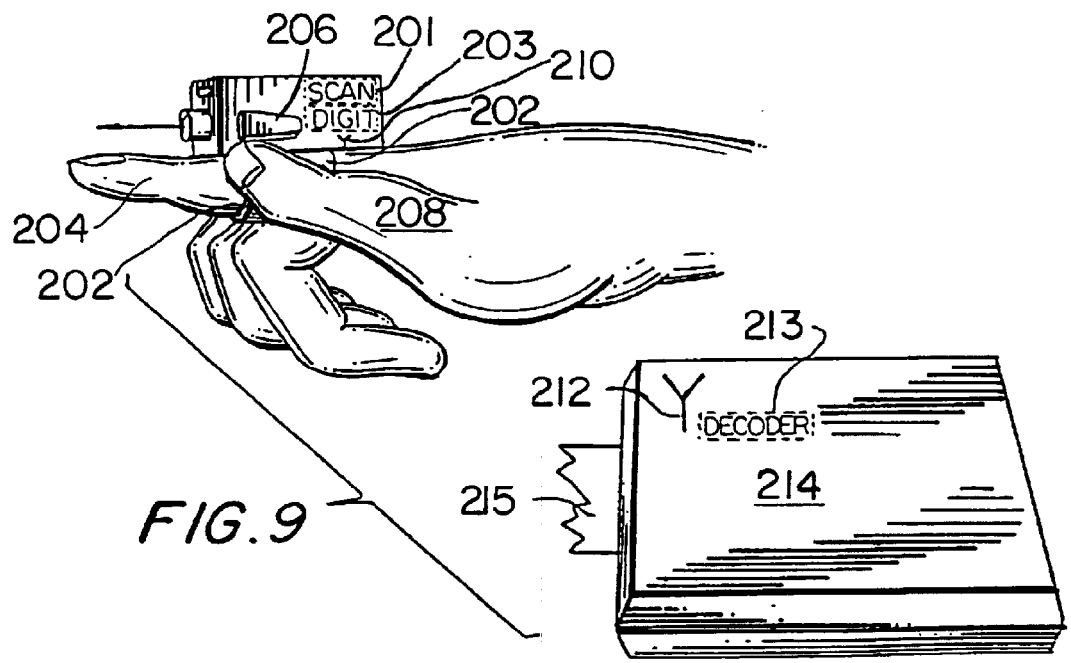
FIG. 9 illustrates an arrangement wherein a miniature reader is mounted on the index finger of an operator, and the electronics in the reader communicates by a short range radio transmitter with a receiver which might typically be mounted on the belt of the operator.

FIG. 9 illustrates an arrangement wherein a miniature scanner 201 as disclosed herein for a bar code reader is mounted within a housing 200 supported on an index ring mounting 202 on the index finger 204 of a user. A trigger switch 206 is provided on the side of the housing 200 which is activated by the user's thumb 208 to actuate the scanner 201. The electronics in the bar code reader communicates the data it has acquired by a short range radio transmitter 210 in the housing 200 to broadcast to an antenna 212 of a receiver in an associated control unit 214, which might typically be mounted on the belt 215 of the user. The control unit 214 in the second housing typically would include a display, a keyboard, or a touch screen functioning as a display/keyboard, similar to that illustrated in FIG. 10. In an alternative embodiment, the scanner could be voice activated with a voice recognition means installed in either the housing 200 or the control unit 214.

A typical prior art bar code reader includes a bar code scanner, a signal digitizer, and a decoder. The bar code scanner generates a light beam directed toward a symbol to be read on a target and receives reflected light from the symbol to produce an analog electrical signal corresponding to the intensity of the reflected light. The signal digitizer includes a signal processor for processing the analog electrical signal to generate therefrom a digitized signal descriptive of the bar code symbol. The decoder decodes or translates the digitized signal into data represented by the symbol.

In the embodiment of FIG. 9, the finger-mounted housing 20 includes therein the bar code scanner 203 for producing an analog electrical signal and a signal digitizer 203 for generating therefrom a digitized signal descriptive of the bar code symbol. The digitized signal is then transmitted by radio transmission to a decoder 213 located in the control unit 214.

Figure 10:
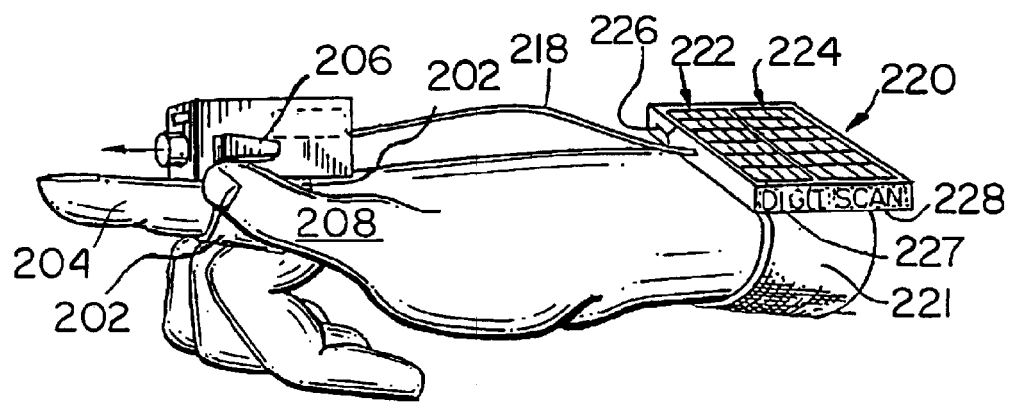
FIG. 10 illustrates an arrangement similar to FIG. 9 wherein a miniature reader is mounted on the index finger of an operator, and the electronics in the bar code reader communicates by a wire with a portable terminal mounted on a wrist band on the wrist of the operator.

FIG. 10 illustrates an arrangement similar to FIG. 9 wherein a miniature scanner 201 as disclosed herein for a bar code reader is mounted within a housing 200 supported on an index ring mounting 202 on the index finger 204 of a user. A trigger switch 206 is provided on the side of the housing 200 which is activated by the user's thumb 208, or alternatively a voice activated arrangement could be utilized therein. The electronics in the bar code reader communicates the analog signal produced by the scanner 201 by a wire 218 with a portable control terminal 220 mounted on a wrist band 221 in a wristwatch like manner on the wrist of the user. The portable terminal 220 typically includes an LED display 222, an array 224 of entry keys, and an antenna 226 for communicating with a central computer. The analog signal on wire 218 is directed to a signal digitizer 227 located in the control terminal 220 which digitizes the analog signal, and the output digitized signal therefrom is directed to a decoder 228 also located in the control terminal 220. The output of the decoder, which is data represented by the scanned bar code symbol, is then transmitted by antenna 226 to the central computer. Accordingly, the embodiment of FIG. 10 also differs from the embodiment of FIG. 9 by placing the digitizer 227 in the associated control terminal 220 rather than in the housing 200.

Figure 12:
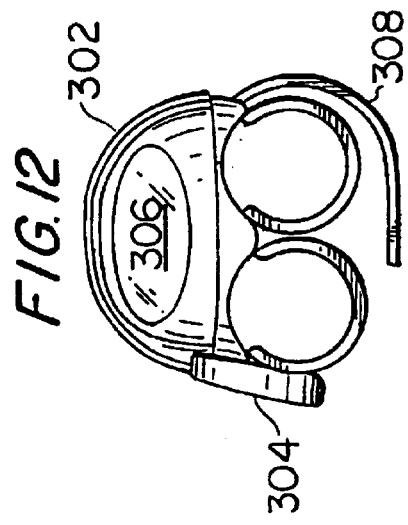
FIG. 12 is a front view of the reader embodiment of FIG. 11.
Figure 13:
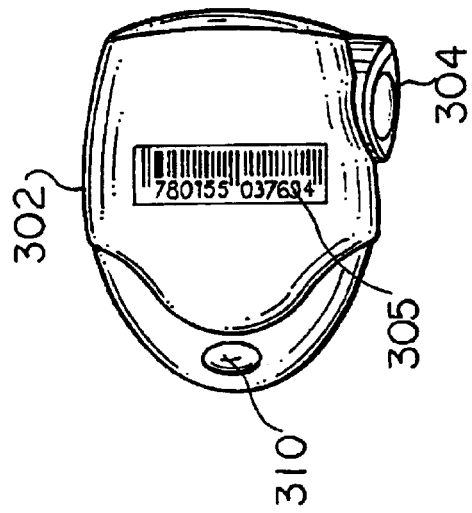
FIG. 13 is a top plan view of the reader embodiment of FIG. 11.
Figure 11:
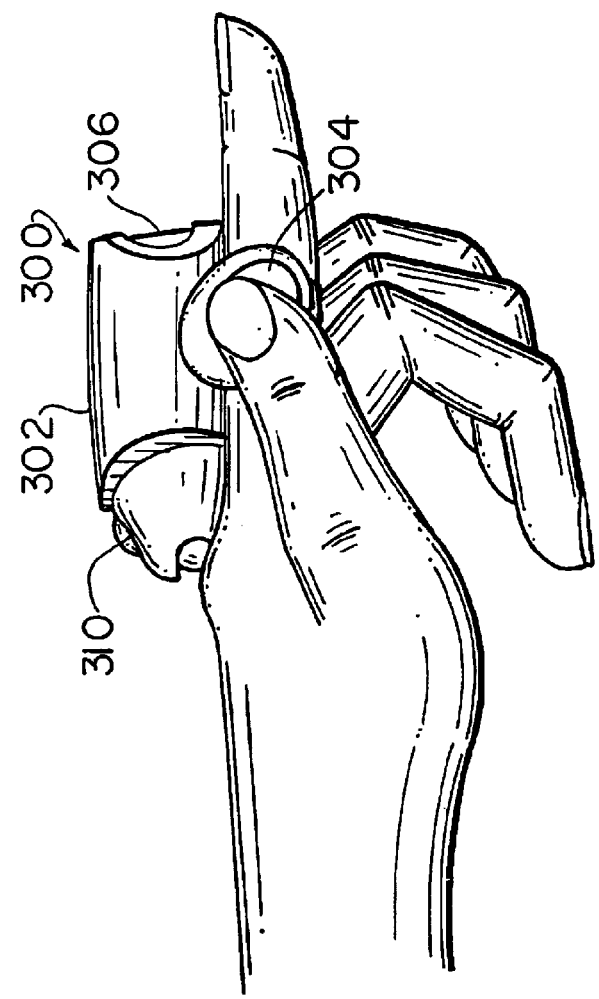
FIG. 11 illustrates another embodiment of a finger-mounted reader.

FIG. 11 illustrates a miniature reader 300 having a housing 302 supported on at least one finger and, as depicted, two fingers, of a user. A trigger 304 on the side of the housing is activated by the user's thumb to initiate scanning. A light-transmissive window 306 is mounted on the housing and faces a symbol to be read. A strap 308 is guided through belt guides to at least partially encircle two of the user's fingers. The housing depicted in FIGS. 11–13 has a low profile and a low center of gravity.

The rear of the housing has a release 310 which, when depressed, disengages a rear housing section, thereby enabling battery replacement and/or recharging. The replaceable battery can be small and hold a limited capacity charge for short-term use, or can be large and hold an extended capacity charge for long-term use. Although not illustrated, a keyboard and/or a display could be provided on the top wall of the housing. A voice recognition circuit could also be provided. A bar code symbol 305 identifying the identity or serial number of the reader 300 is provided on the housing.

Figure 14:
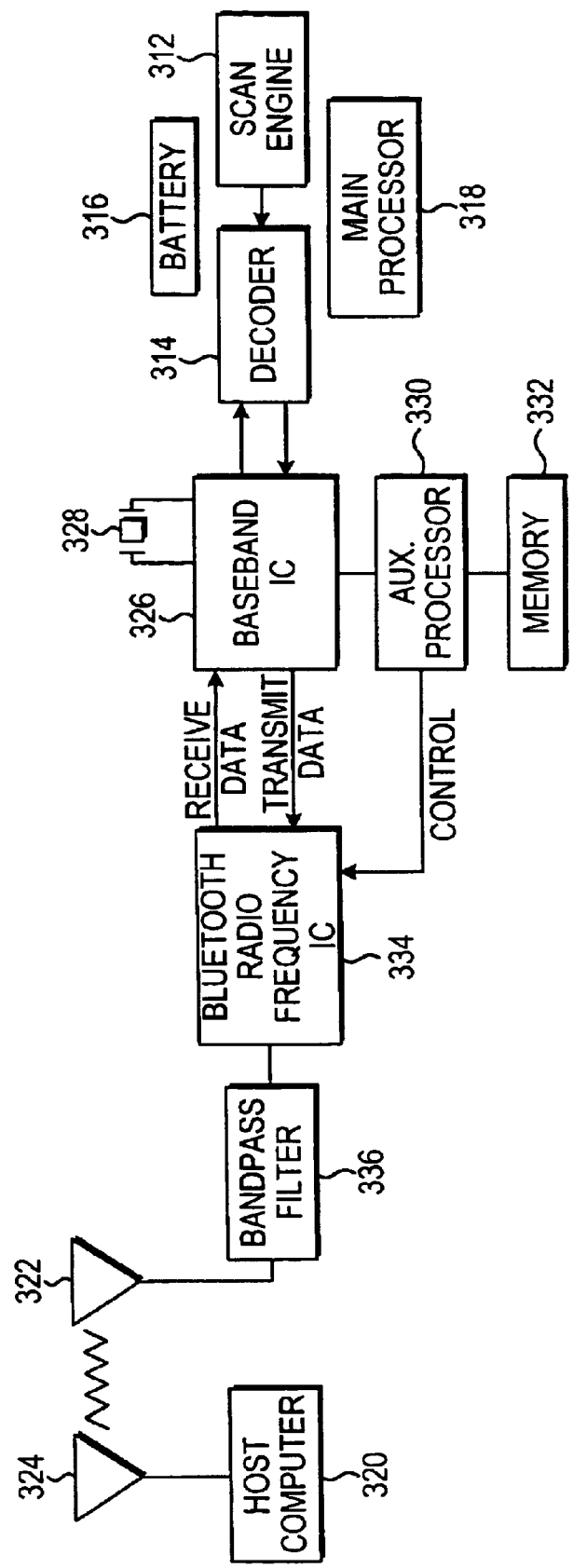
FIG. 14 is a block diagram of the electronic circuitry employed in the reader of FIG. 11.
Figure 15:
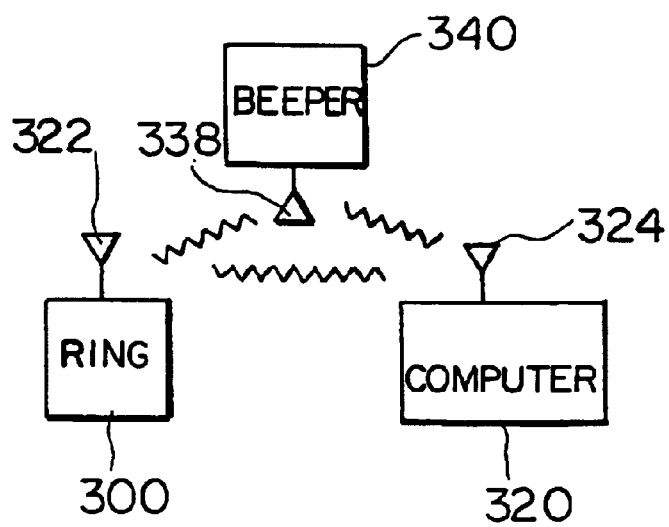
FIG. 15 is a block diagram depicting the communication among the reader of FIG. 11, a host and a beeper.

As depicted in FIG. 14, the electronic components onboard the reader 30 include a scan engine 312 which includes a light source for generating a light beam; optics for directing and focusing the beam through the window 306 to a symbol for reflecting therefrom; a sensor for receiving reflected light from the symbol and entering the reader through the window 306, and for producing an analog electrical signal corresponding to the intensity of the reflected light; a scanner for sweeping the light beam across the symbol and/or for scanning a field of view of the sensor; and a digitizer for processing the analog signal to obtain a digitized signal descriptive of the symbol.

The reader further includes a decoder 314 within the housing 302, and operative for decoding or translating the digitized signal from the scan engine into a decoded digital data signal representing the symbol. A battery 316 supplies electrical power, and is preferably rechargeable. A main processor 318 controls the operation of the scan engine and the decoder.

This invention further proposes transmitting the data signal away from the finger-mounted scanner 300 to a remote host 320, such as a computer, by radio frequency wireless transmission between reader antenna 322 and host antenna 324 via a low power communications protocol, such as the Bluetooth or the Aloha protocols, which minimize energy expenditure by the onboard battery 316. FIG. 14 depicts a suitable transmitter circuit comprising a baseband integrated circuit 326 having a low power crystal oscillator 328, and controlled by an auxiliary processor 330 connected to a memory 332.

The baseband circuit 326 is in bidirectional communication with a radio frequency integrated circuit 334, for example, one controlled by the auxiliary processor 330 to function in accordance with the standards of the Bluetooth protocol. The radio frequency circuit 334 is connected to the reader antenna 322 via a bandpass filter 336 to remove noise.

In the preferred embodiment, the components 326–336 are mounted on a single printed circuit board; and the decoder 314 and the processor 318 are mounted on a printed circuit board on the scan engine.

The transmitted data signal is received by the host antenna 324 where it is processed by the host 320. For example, the host may refer to a look-up table in which an attribute, for example, a purchase price, of a product identified by the symbol, is retrieved. The host may also develop a customer buying profile in which the products purchased at a retail site are catalogued.

Upon receipt of the transmitted data signal, the host generates an acknowledgment signal and transmits the same by radio frequency, wireless transmission to a remote annunciator 340 having an annunciator antenna 338. The annunciator 340 generates an audible sound, for example, a beep to signify that the transmitted data signal was indeed received by the host. The sound can be a single tone or multiple tones. The annunciator could general a visible display, such as a light being illuminated.

Figure 16:
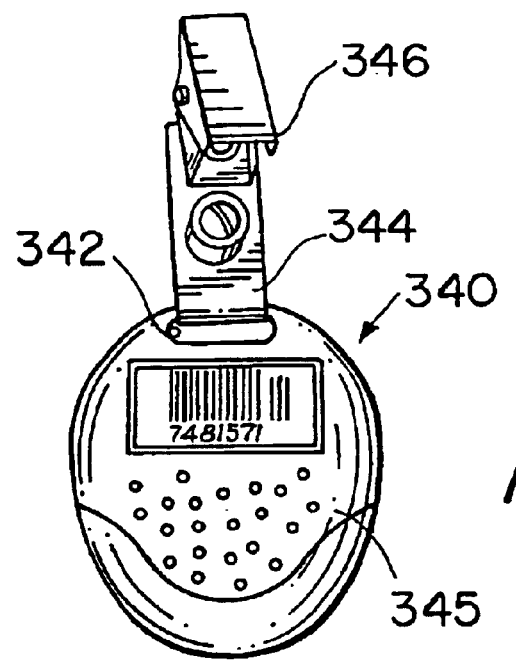
FIG. 16 is a perspective view of the beeper used with the reader embodiment of FIG. 11.

The annunciator or beeper 340 is also remotely located from the reader 300, but is within earshot of the user. Preferably, as shown in FIG. 16, the beeper includes a casing having a mounting aperture 342 through which a strap 344 having a clip 346 is passed. The clip 346 is spring-biased and can be clipped onto the user's clothing, particularly a pocket. A necklace can similarly be passed through the aperture 342 to enable the beeper to be suspended from the user's neck.

It is known in the art to generate onboard the reader itself a beep signifying that a symbol has been successfully read, or that an error occurred during reading. When a reader is operated in a noisy environment, it is known to generate a beep in excess of 85 dB which simply increases the overall noise level.

In accordance with this invention, the radio frequency transmission of any acknowledgment sound to a remote device is novel and, more particularly, the transmission of a beep signifying that a remote host has received a transmitted data signal is also novel. The mounting of the beeper on one's clothing, or around the neck, positions the beeper closer to the user's ear and, therefore, a loud beep need no longer be generated, and the environment can be made less noisy.

The beeper could also be implemented in an earphone, a helmet or a hat, or in a headset having an earphone and a microphone for bidirectional communication.

A bar code symbol 345 identifying the identity or serial number of the beeper 340 is provided on the casing. It will be recalled that the reader 300 and the beeper 340 are separate devices in radio frequency communication with each other and with the host computer 320. Since the host computer may, and frequently does, receive a data signal from more than one reader, and since the host computer may, and frequently does, transmit an acknowledgment signal to more than one beeper, it is necessary to associate each beeper with a respective reader so that the beep will correspond to the active reader. By way of example, a point-of-transaction site may have one reader and one or more beepers, or may have multiple readers and one or more beepers.

In order to associate a beeper with a reader, a set-up mode is established whereby the reader reads the beeper symbol 345 and stores the identity or serial number of the beeper in memory within the reader. The identity or serial number of the reader, as exemplified by the reader symbol 305, is already stored in the memory. Thereupon, in an operating mode, when the reader transmits the data signal to the host computer, the identities of the associated beeper and of the reader are transmitted so that the host computer now knows to which beeper the acknowledgment signal should be sent.

The aforementioned Bluetooth and Aloha protocols conserve energy usage by not being continuously powered. For example, under the Bluetooth protocol, the transmitter in the finger-mounted reader can be inactive for a period of time, for example, a minute, and then can wake up for a certain interval, for example, two seconds to transmit the data signal. Alternatively, the transmitter can wake up every one-half second to transmit the data signal. Also, the host computer can poll the transmitter every interval to wake up the transmitter.

Under the Aloha protocol, there is no polling. The transmitter automatically downloads the data signal to the host after scanning, and waits for an acknowledgment. Otherwise, the transmitter stays inactive.

Figure 17:
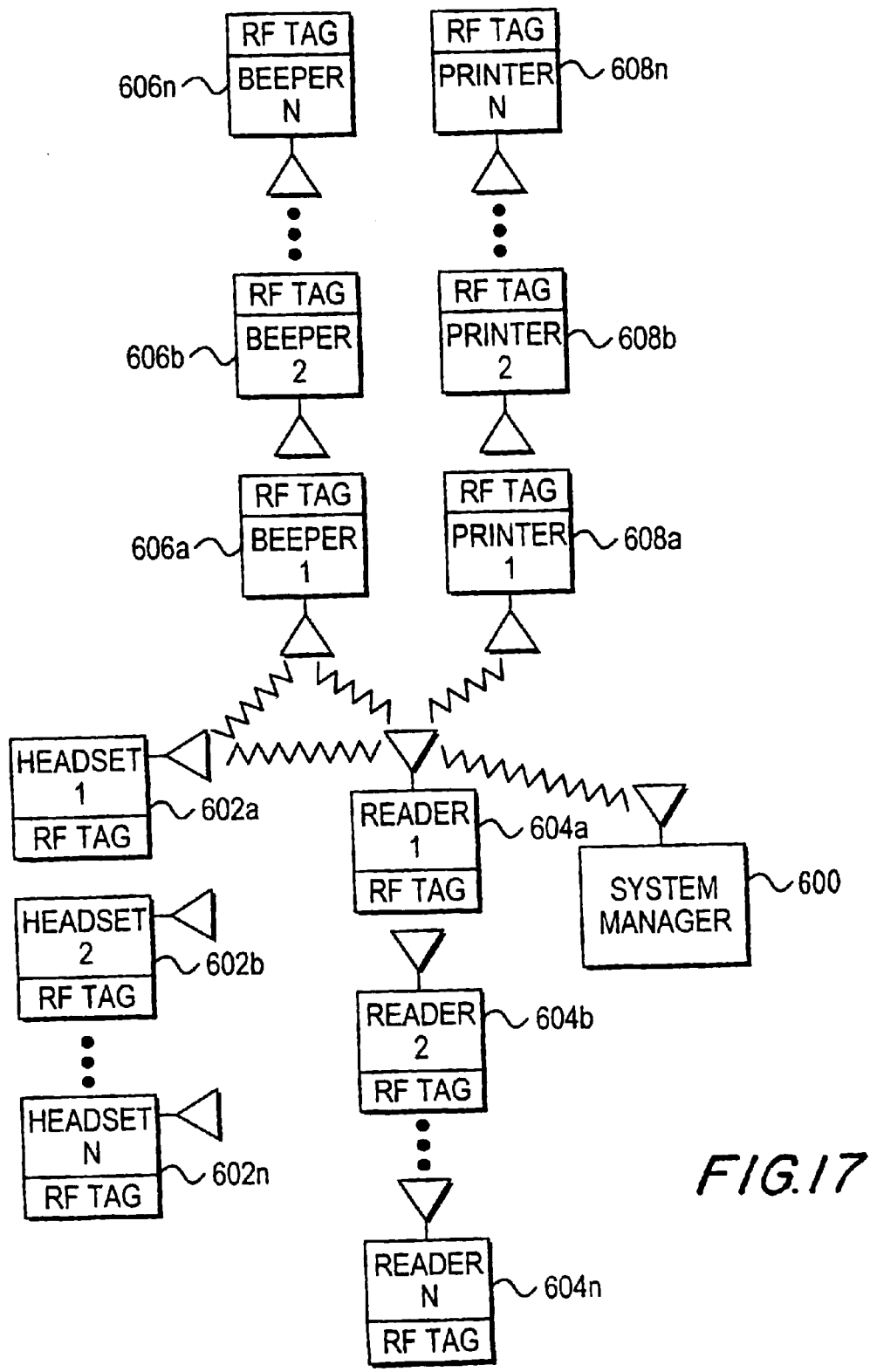
FIG. 17 is one embodiment of a wireless local area network employed in a bar code symbol reading system.

FIG. 17 depicts a wireless local area network managed by a system manager 600. A plurality of headsets 602a, 602b . . . 602n; a plurality of readers 604a, 604b . . . 604n; a plurality of beepers 606a, 606b . . . 606n; and a plurality of printers 608a, 608b . . . 608n are available for incorporation into a working system. Each one of the components illustrated in FIG. 17 includes an antenna and a radio frequency transmitter for transmitting an identifying signal that uniquely identifies the respective component. One or more headsets, readers, beepers and printers is selected for the working system. As shown, components 602a, 604a, 606a and 608a were selected and are in radio frequency communication with the system manager. During a set-up mode, a transmitter on-board each component advises the system manager of its identity and of its selection to be part of the working system.

In operation, the headset serves as an actuator to control the reader. As before, the manager sends an acknowledgment signal to the beeper to signify that a bar code symbol has been successfully read by the reader. A printer can be used to produce a receipt of a transaction generated by the network.

Rather than employing an on-board transmitter for transmitting an identifying signal, each component can be provided with a unique bar code symbol printed on a tag secured to the respective component in a manner analogous to that described above for reference numeral 305. In this case, a symbol reader, for example, one of the readers 604a . . . 604n, or another reader, is used to read each unique symbol, thereby identifying each component to the system manager.

FIG. 18 depicts another wireless local area network, but this time in connection with a home entertainment system managed by a system manager, preferably an audio/video receiver 610. A plurality of controllers 612, 614, 616; a plurality of audio/video components, such as a camera 618, tape player 620, VCR 622, laserdisc player 624, tuner 626, DVD player 628, CD player 630, and game player 632; a plurality of audio/video connections 634, such as cable, a roof antenna, a satellite dish, or a telephone; a plurality of related systems 636, such as a heating or a lighting system; and audio/video output devices such as a monitor 638 and/or a speaker system 640 are available for incorporation into a working system. Each one of the peripherals illustrated in FIG. 18 includes an antenna and a radio frequency transmitter for transmitting an identifying signal that uniquely identifies the respective peripheral. One or more controllers, audio/video components, connections, related systems and output devices is selected for the working system. During a set-up mode, a transmitter on-board each peripheral advises the system manager of its identity and of its selection to be part of the working system.

In operation, one or more of the controllers is used to control any one or more of the peripherals. One or more of the audio/video components sends its data to the receiver which, in turn, sends its output signals to the monitor or speaker system. One or more of the connections is selected for connection to one or more of the components.

As before, rather than employing an on-board transmitter for transmitting an identifying signal, a unique identifier such as a bar code symbol may be provided on each peripheral. Thereupon, a symbol reader is used to read the symbol for each selected peripheral, thereby advising the system manager of the identity of each peripheral.

Depending on the size of a physical location of the network, each peripheral may not communicate directly with the system manager, but instead, may communicate with one or more relays which, in turn, communicate with the system manager, sometimes via access points or nodes and via bridges to other networks. All radio frequency communication is by short-range radio, typically within a ten foot radius.

The intercommunication among the peripherals and the system manager enables the latter to actively search for and, in effect, latch onto the peripherals needed to make an operative network. For example, if a left speaker identifies itself to the system manager, then the manager will look for a right speaker and, depending on the network, a subwoofer and surround sound speakers, too.

The intercommunication among the peripherals and the system manager also enables a user to associate himself or herself with the network. The system manager may be available to multiple allowable users, but will only enable network operation after user authentication, for example, by manually entering a password, by manually swiping a magnetic card, by inserting a token such as a smart card, a chip module, or a radio frequency identification card, or by some biometric sensor such as a face, fingerprint, retinal or voice recognition system.

Figure 19:
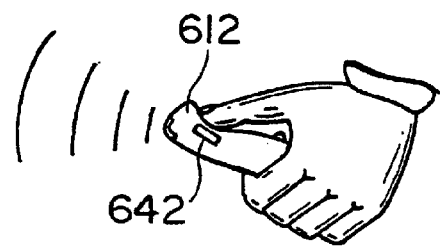
FIG. 19 is a schematic view of a hand-held controller with a biometric sensor.
Figure 20:
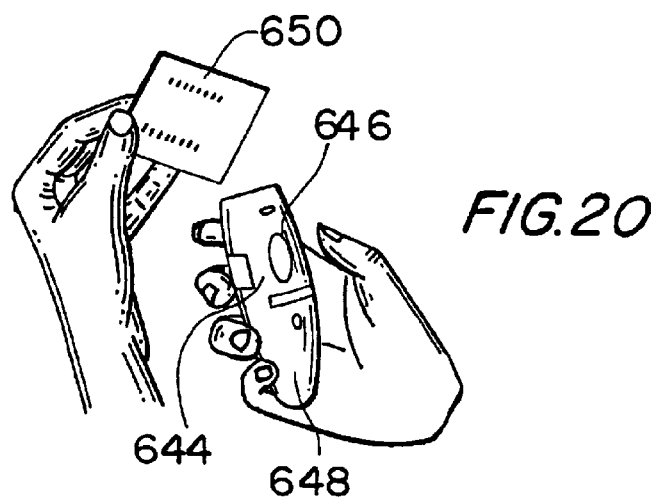
FIG. 20 is a perspective view of a bar code symbol reader with a biometric sensor built into a trigger on the reader.

FIG. 19 depicts a biometric sensor 642 built into a hand-held controller such as identified by numeral 612 in FIG. 18. FIG. 20 depicts a biometric sensor 644 integrated in a trigger 646 of an electro-optical reader 648 for reading a bar code 650.

Figures 21, 22:
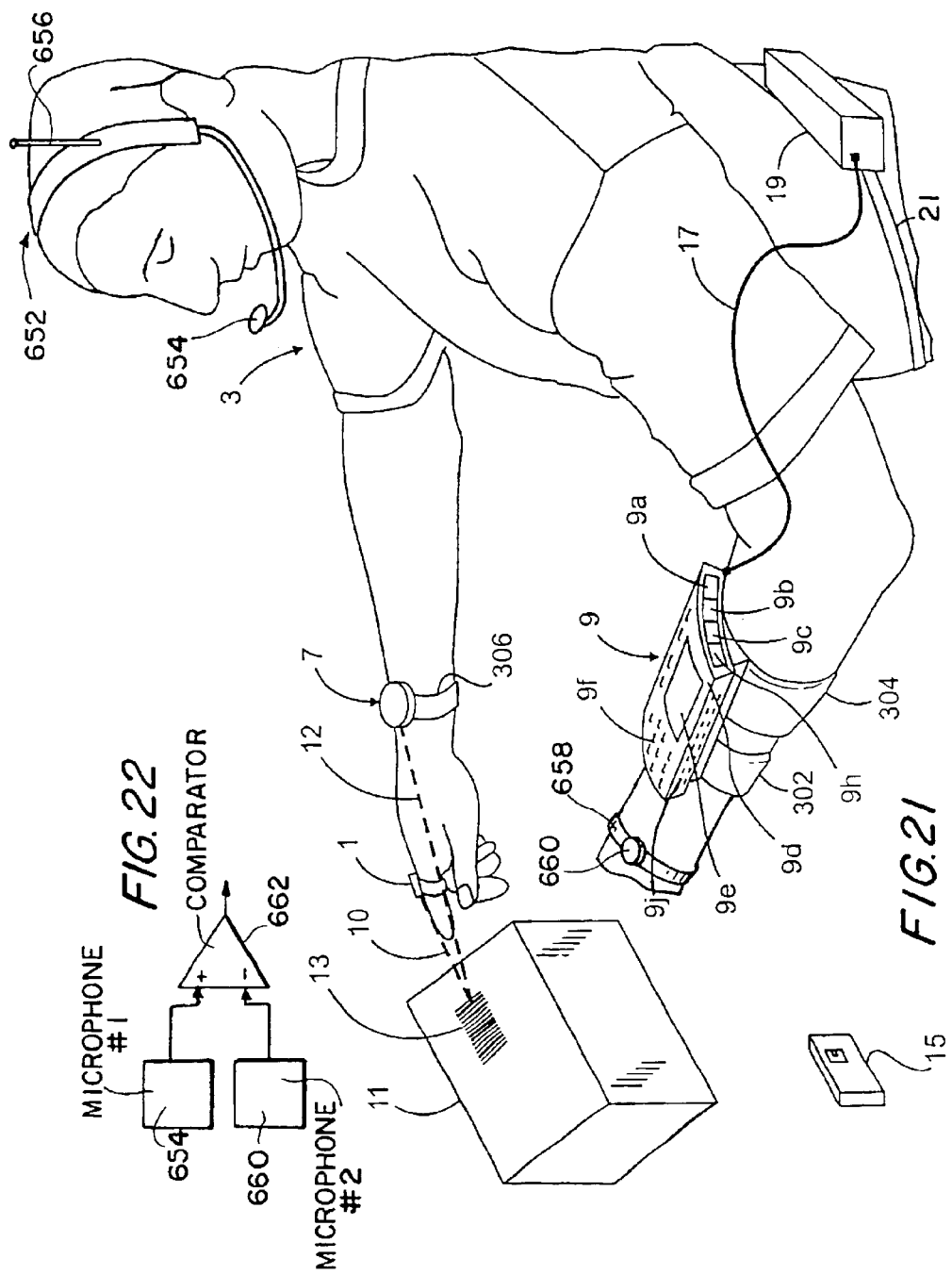
FIG. 21 is a perspective view analogous to FIG. 1A, but with a voice recognition capability.
FIG. 22 is a schematic block diagram of a voice recognition circuit.

FIG. 21 is a perspective view identical to FIG. 1A, except for the addition of a headset 652 carrying a primary microphone 654 and an antenna 656, as well as a wrist-mounted band 658 carrying a secondary microphone 660 and a built-in antenna. The network of FIG. 1A includes the peripherals 1, 7 and 9 and operates as described above. The user speaks into microphone 654 and main control signals are transmitted by antenna 656 to control network operation. For example, the user may say: "Begin scanning" in order to initiate reading of the symbol 13. Such voice control can replace a manual trigger, or it can be used to transmit data to a host computer for look-up or storage purposes.

Since the reading of symbols often occurs in a noisy environment, such as a factory setting, the main microphone 654 also detects background or ambient noise which corrupts the main control signal. Hence, the secondary microphone 660 is positioned away from the user's mouth and only detects the ambient noise. As shown in FIG. 22, the outputs of microphones 654, 660 are conducted to a comparator 662 where the effect of ambient noise is subtracted from the output of the main control signal, thereby enabling more reliable system control.

Another feature of this invention related to voice control is a system capability of completing dropped syllables uttered by a user. Thus, the syllables of, for example, a telephone number that are detected by the system are compared to given telephone numbers stored in a look-up database. The undetected syllables are then completed by retrieval from the database, as well as by detecting the time intervals of the missing syllables.

Still another feature resides in authorizing network access by recognizing the user's voice by comparison with a look-up database that stores prerecorded voices that are authorized to access the network.

Yet another feature resides in error correcting codewords to insure data integrity. The network can be designed so that the user speaks a series of words or numbers followed by a series of check characters. A look-up database is accessed to determine whether any of the words or numbers corresponding to the series of check characters are incorrect and, if so, the incorrect words or numbers are corrected.

Another key feature of the present invention is to implement a variety of adaptable "self triggering" or "object sensing" modes of operation that eliminate the need for a manual trigger switch, and also optimize the turning on of the scanning and bar code reading operation for different ergonomic implementations—fixed mount, hand-held (including hand-supported), ring or finger-mounted, body mounted, etc., all of which may require different "turn on" conditions for the user applications envisioned. Reference is made to U.S. Pat. No. 5,280,162 for background information describing a scanning system operable in a "sleep" mode including object sensing, and a "scanning" mode after sensing an object in the scanning field.

Although the present invention has been described with respect to reading bar codes including stacked, or two dimensional bar codes such as Code 49, PDF 417 and similar symbologies, it is conceivable that the method of the present invention may also find applications for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated as a single printed circuit board or integral module. Such a module can interchangeably be used as the laser scanning element for a variety of different types of data acquisition systems. For example, the module may be alternately used in a ring, hand-held or body-mounted scanner, a table top scanner attached to a flexible arm or mounting extending over the surface of the table or attached to the underside of the table top, or mounted as a subcomponent or subassembly of a more sophisticated data acquisition system. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, e.g., operability at a certain working distance, or operability with a specific symbology or printing density. The characteristics may also be defined through software or by the manual setting of control switches associated with the module. The user may also adapt the data acquisition system to scan different types of articles or the system may be adapted for different applications by interchanging modules on the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a portable or stationary receiver or base station.

Figure 24:
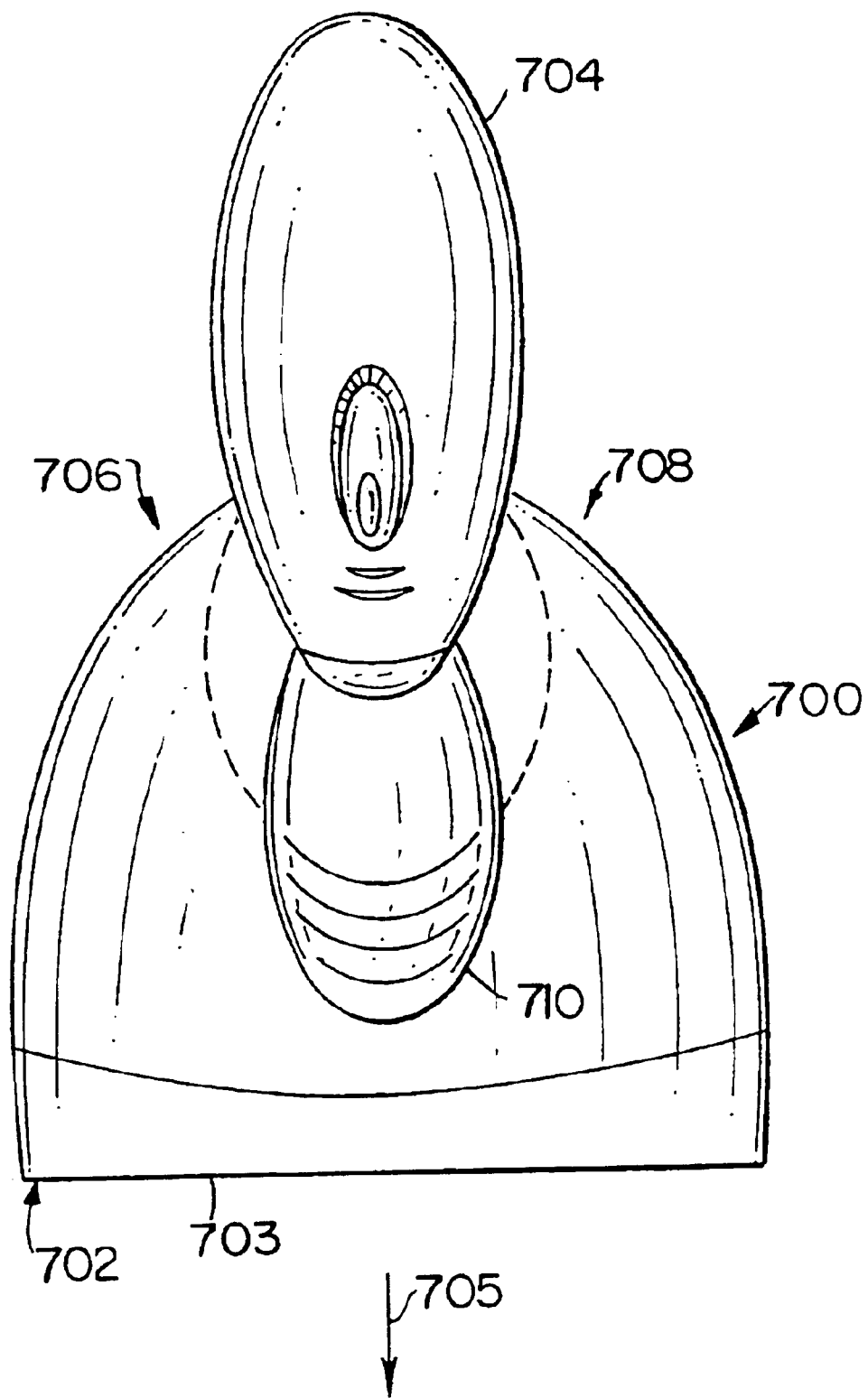
FIG. 24 is a top view of the scanner of FIG. 23.

FIGS. 23 and 24 show a hand-held optical scanner. As may be seen in those figures, the scanner housing 700 is of a shape perhaps best described as modified (flattened) spherical or ovoid. It could also be described as being the shape of a squashed softball. A diagonal flat face 702 of the housing has, within it, a window 703 from which emerges in use a scanning light beam 705. Light reflected from the bar code symbol or other indicia being read passes back through the window and is detected by a photodetector, as will be described in more detail below.

On the upper part of the ovoid body 700 is a rearwardly-extending hydrofoil shaped structure or wing 704, which is preferably molded of a plastics material integrally with the main body 700. On the upper part of the body 700, immediately forward of the wing 704 is a switch or trigger 710.

Figure 25:
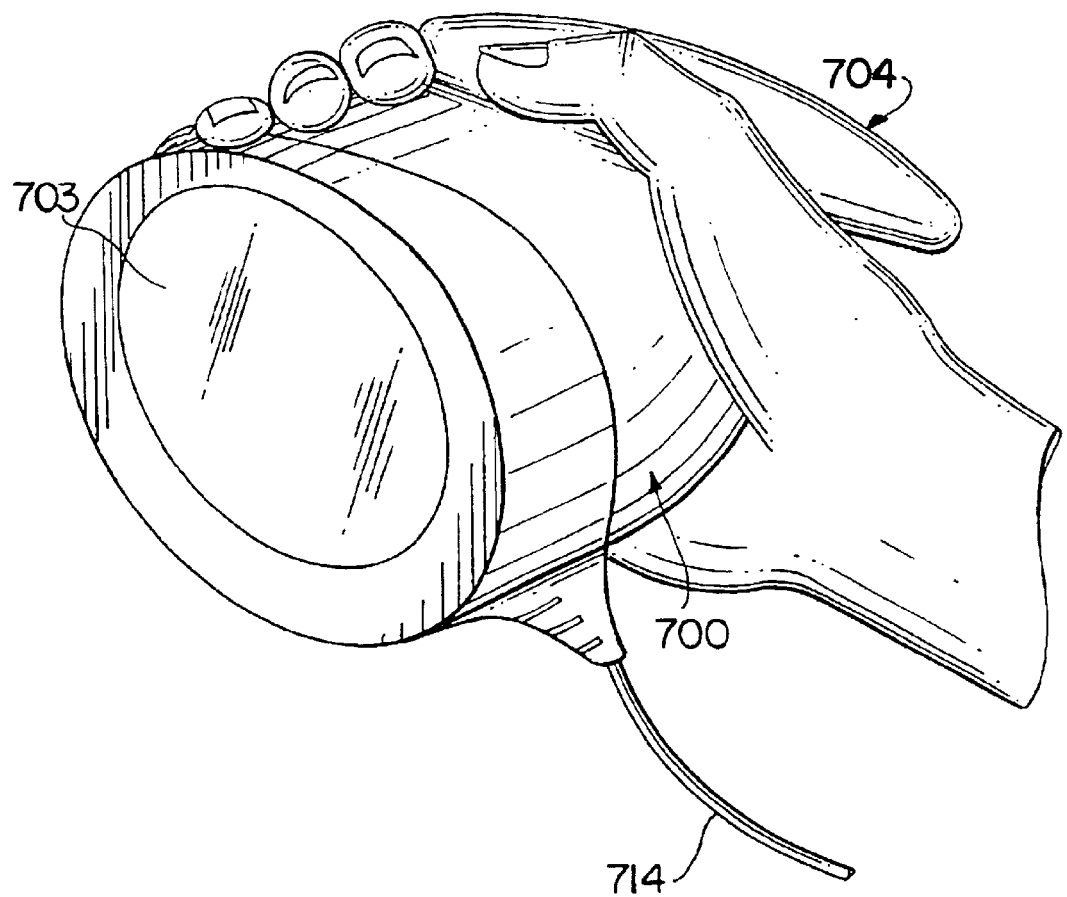
FIGS. 25 and 26 show the scanner of FIG. 23 in use.
Figure 26:
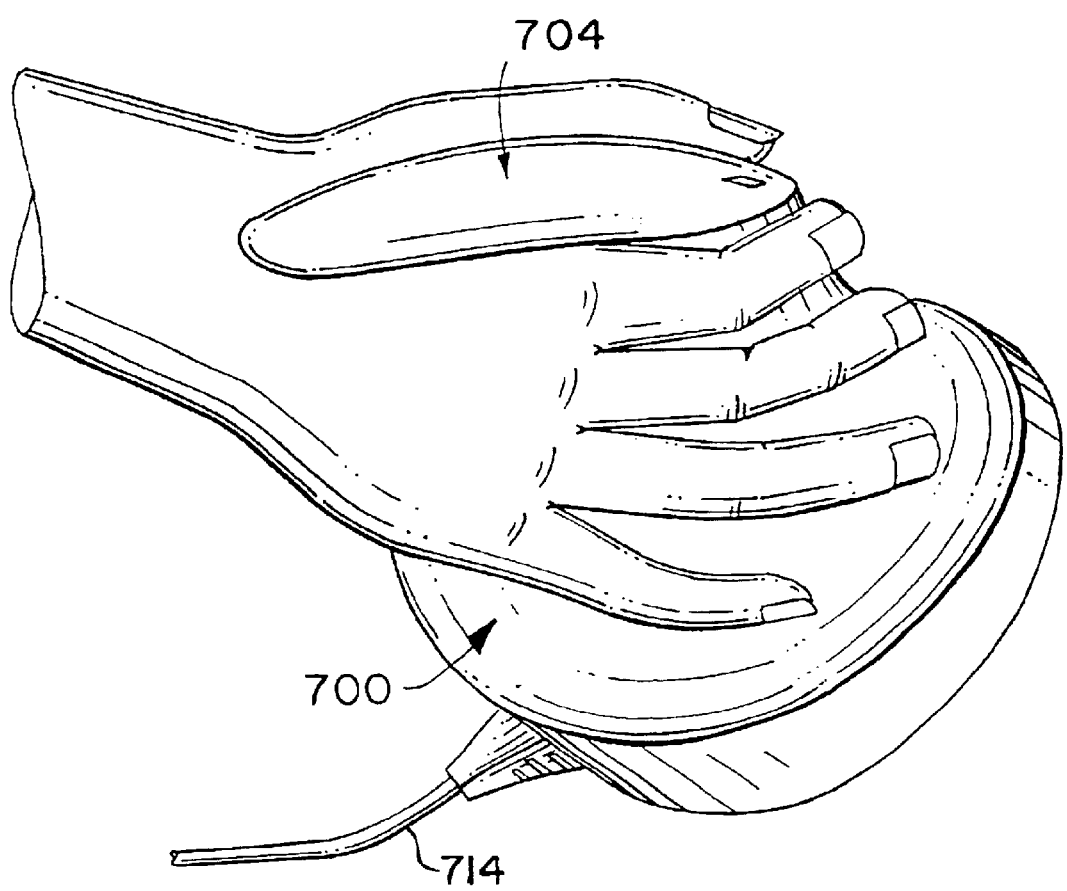

The body 700 is of a size convenient to be held within a user's hand; typically, it may be about 4 inches (10 centimeters) in diameter, measured along the length of the flat front surface 702. In use, as may best be seen in FIGS. 25 and 26, the user grasps the body 700 in his or her hand, with the thumb passing to one side of the wing 704 and the fingers to the other side. When grasped by a right-handed person, the thumb grasps in the direction of the arrow 708 in FIG. 24, and the fingers in the direction of the arrow 706. The flesh between the thumb and first finger abuts a valley portion 712 at the rear of the wing. In this position, the user can operate the trigger 710 with his or her fingers. It will be noted that the device is symmetrical, and so is equally usable for left-handed and right-handed users.

In use, pressure on the trigger 710 causes scanning to commence. Information received from reflected light is passed on for further processing along a downwardly and rearwardly-directed lead 714. Further details of one preferred scanning mechanism, within the body 700, will now be described with reference to FIG. 43.

Figure 43:
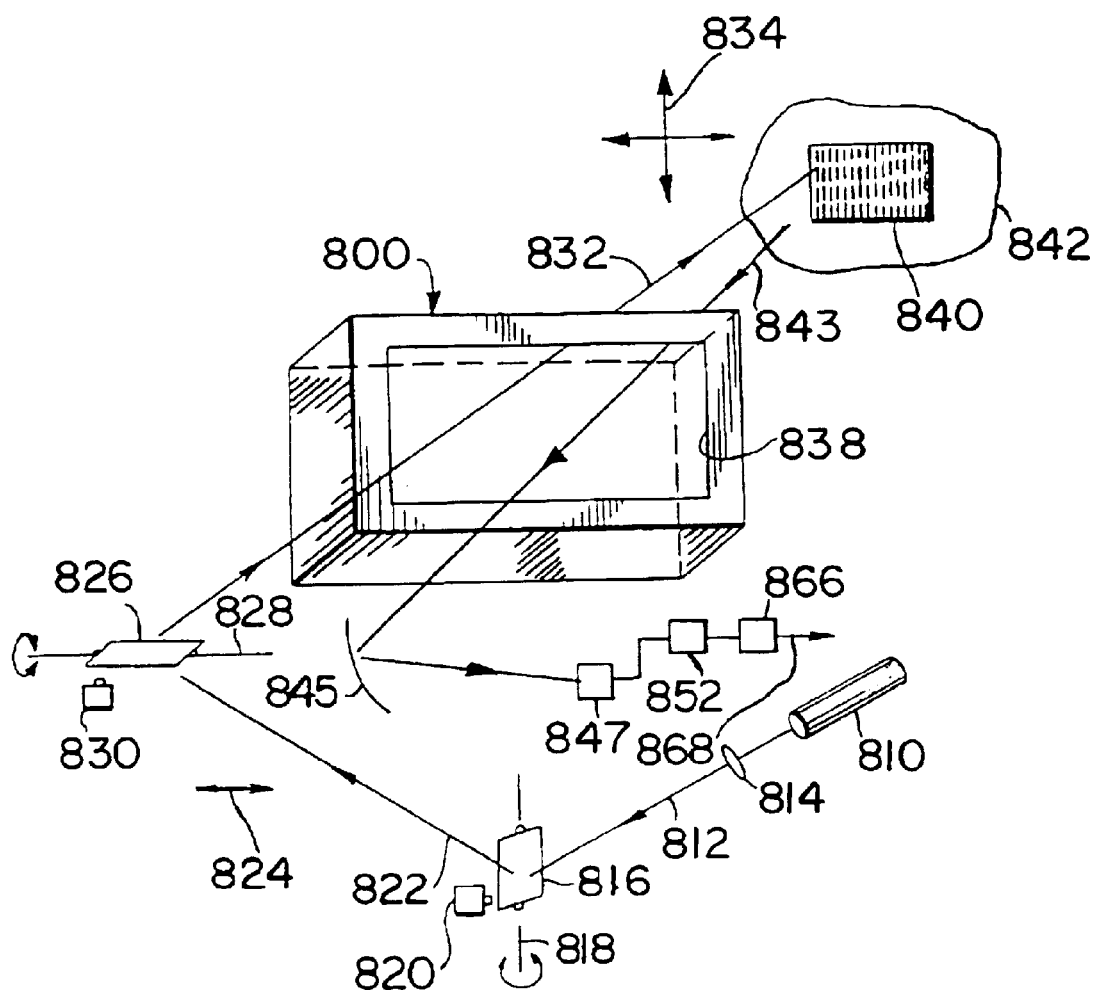
FIG. 43 shows one exemplary internal arrangement for the various scanners shown in FIGS. 23–34.

In the preferred internal arrangement, shown in FIG. 43, a laser 810 produces a beam 812 which is conditioned by optical elements 814 before impinging upon a first scanning mode 816 which is arranged to oscillate about a vertical axis 818 by means of a first motor 820. The oscillation of the mirror 816 causes the reflected beam 822 to scan back and forth in the X direction as is indicated by the arrows 824. The scanning beam 822 then impinges on a second scanning mirror 826, this mirror being arranged to oscillate about a horizontal axis 828 by means of a second motor 830. It will be understood that the combined oscillation of the mirrors 816, 826 creates a reflected beam 832 which scans in both the X and Y directions, as indicated by the arrows 834. The mirrors 816, 826 may be mounted for oscillation in any convenient manner.

The beam 832 leaves the housing 800 via the window 838. Although this is shown as rectangular in FIG. 43, in the specific embodiment of FIG. 23, the window is preferably circular. The beam then impinges upon a two-dimensional bar code symbol or other indicia 840 which has been printed onto or otherwise secured to a substrate 842. The indicia 840 may be any type of image that has to be captured by the scanner. It will be appreciated that many types of one-dimensional or two-dimensional symbols could be read with the present system, for example bar code symbols according to the PDF 417 symbology. Other types of two-dimensional images, such as signatures, may also be captured. In embodiments in which one-dimensional symbologies are to be captured, for example bar code symbologies such as Code 39, Code 93, Code 128, Code 2 of 5, UPC and so on, only one of the scanning mirrors 816, 826 would be needed.

Light 843 which has been reflected from the indicia 840 passes back through the window 838 and impinges upon a collecting mirror 845 which focuses it onto a photodetector 847.

By suitable control of the amplitude and relative phase of the oscillations of the mirrors 816, 826, the beam 832 may be made to trace out an appropriate desired pattern in two-dimensions across the indicia 840. Typically, the desired pattern will be a raster scan pattern, comprising a series of generally parallel horizontal (X-axis) scan lines which are defined by the first mirror 816, spaced along the vertical (Y-axis) by an amount which is defined by oscillation of the second mirror 826. Alternatively, by appropriate control of the two mirrors, other two-dimensional patterns may be created. Examples include Lissajous figures, or the scanning patterns shown in FIGS. 40–42.

Signals from the photodetector 847 are passed to a digitizer 852 and then to a decoder 866. The signals from the decoder 866, along the line 868, represent high-level decoded information (text or numbers) corresponding to the information originally coded by the bar code symbols 840.

Depending upon implementation, either or both of the digitizer 852 and the decoder 866 may reside outside the scanner body 800, for example in a base unit or stand.

Figure 27:
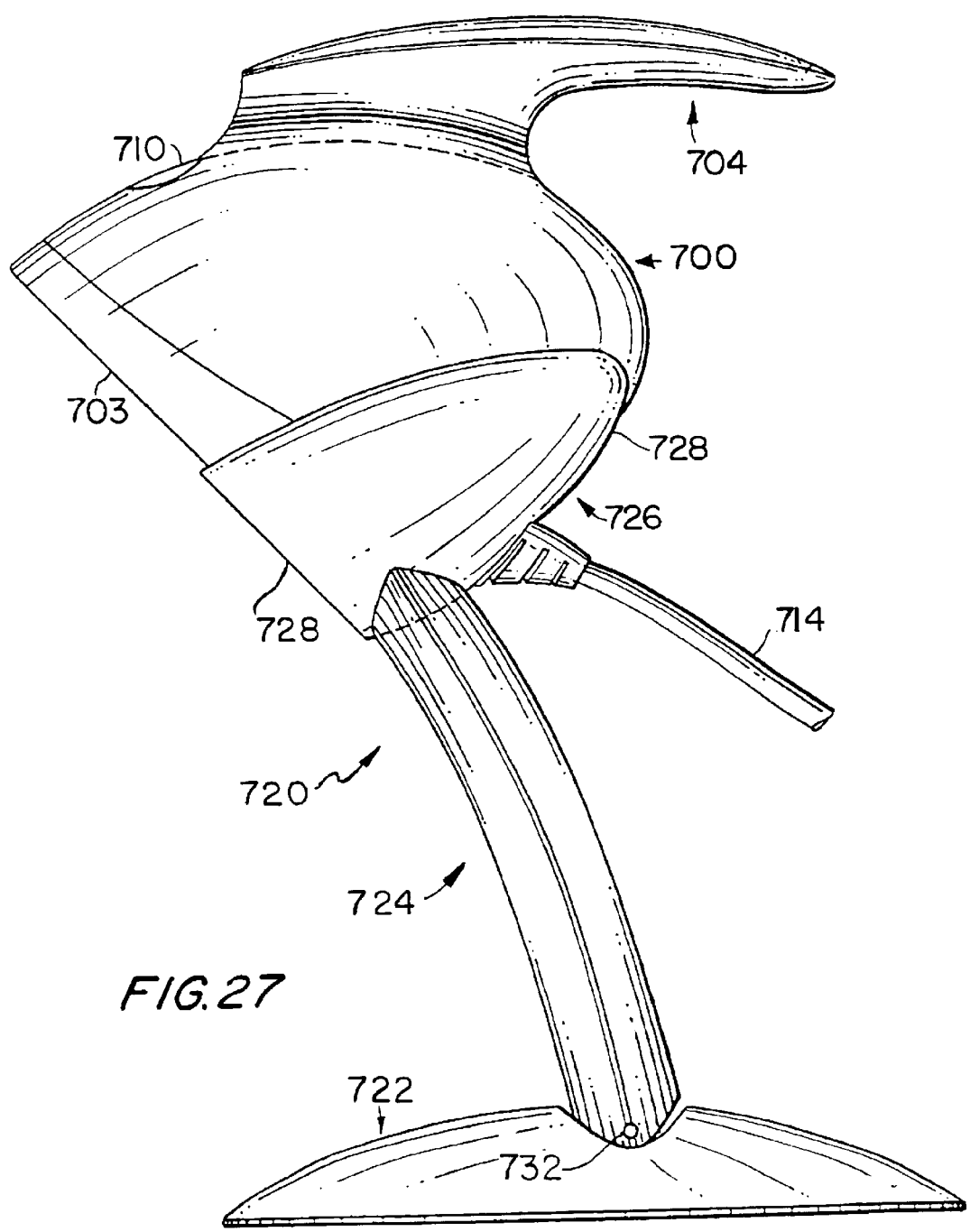
FIG. 27 shows the scanner of FIG. 23 in its cradle.

FIG. 27 shows the scanner of FIGS. 23–26 mounted for hands-free operation in its stand 720. The stand 720 comprises a base portion 722, suitable for positioning on a desk or other flat surface, a stalk 724 and a support cradle 726. The cradle 726 has a split rear section 728, to receive the lead 714, and an open area 728 at the front so as to avoid blocking the scanner window 703.

In the position shown, the scanner may be operated in a hands-free mode, either by making use of the trigger 710, or alternatively by providing for automatic operation of the scanner when it senses it has been placed within the cradle 726. To that end, the scanner may incorporate a detector or microswitch 730 (FIG. 23).

The user may adjust the position of the scanner by rotating the stalk about its pivot axis 732 on the base 722. Sufficient friction is provided at the pivot axis 732 so that the cradle and scanner remain in any desired position. Once placed in a convenient position, the user may scan a succession of items merely by passing them in front of the scanner window 703. If an item has to be scanned which cannot conveniently be positioned in front of the scanner, the user simply lifts the scanner from the cradle, takes the scanner to the item in question, and returns it once the scan has been completed.

FIGS. 28 and 29 show an alternative embodiment of the scanner and stand. In this embodiment, the scanner is actuated by a thumb-operated trigger 740, causing a scanning beam to be emitted via circular window 742 in the housing. Again, the scanner may be operated in a hand-held mode, or in a hands-free mode positioned, as shown, in its cradle 744. To assist in the positioning of indicia to be read, when the scanner is used in the cradle, the cradle is provided with a wire spacer 748. By positioning a bar code to be read up against the spacer, the user may ensure that it is at an optimal distance from the window 742.

The embodiment of FIGS. 28–29 includes a stalk 750 which is in two sections: a front section 752 and a rear section 754. The rear section may be slid upwardly with respect to the front section, thereby effectively extending the length of the stalk. There is sufficient friction between the two parts of the stalk to ensure that the parts will remain in any desired position. Likewise, there is sufficient friction at the pivot point 756 to ensure that the stalk may be positioned at any desired angle.

Figure 31:
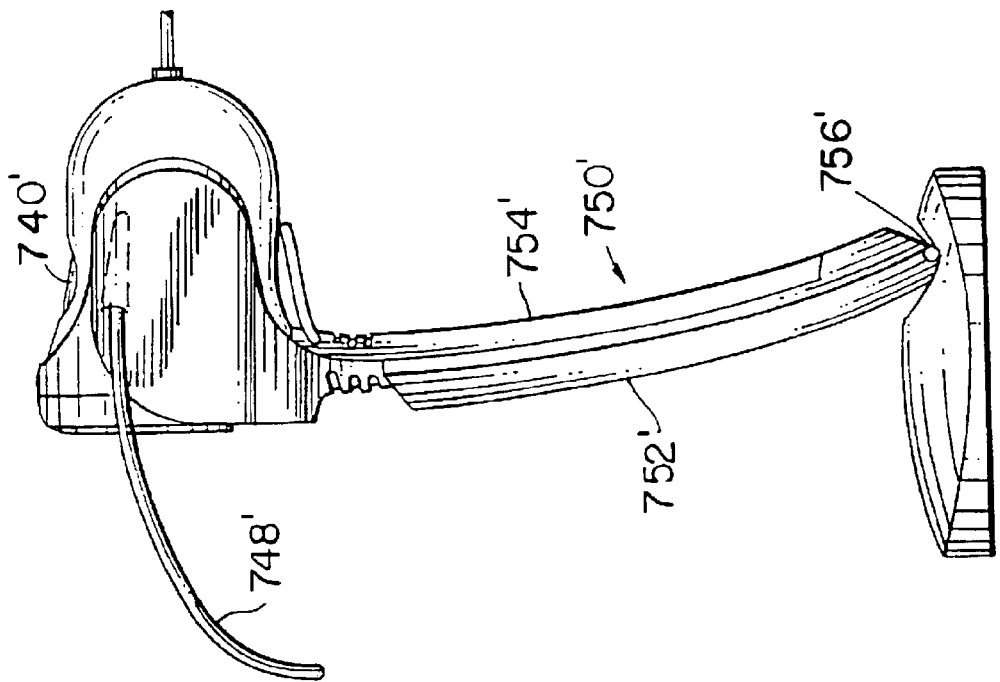
FIGS. 30 and 31 are respectively front and side views of yet another embodiment, in place in its cradle.
Figure 30:
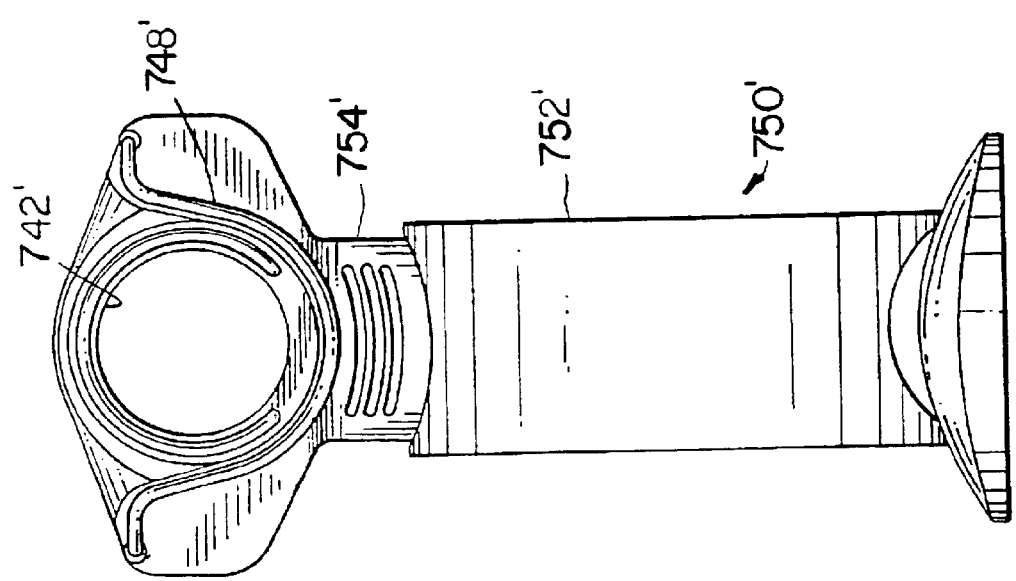

Yet a further embodiment is shown in FIGS. 30 and 31. Similar parts to those shown in FIGS. 28 and 29 are represented by the same reference numerals, with the addition of a prime.

All of the embodiments so far discussed communicate with a base unit (not shown) via a data lead such as the lead 714 in FIG. 23. However, communication could equally well be by wireless transmission. Alternatively, the scanners shown could include their own data stores (for example in RAM), allowing the lead 714 to be dispensed with. In such an arrangement, the information stored in the RAM would automatically be downloaded into the base unit when the scanner is returned to its cradle.

Figure 33:
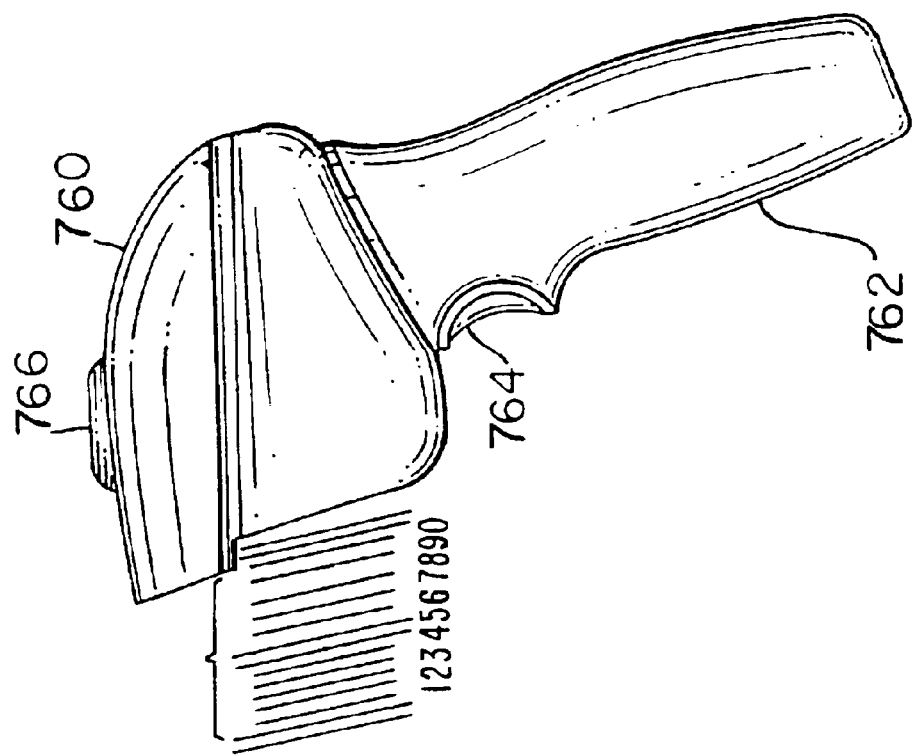
FIGS. 32 and 33 are front and side views of a wireless hand-held scanner.
Figure 32:
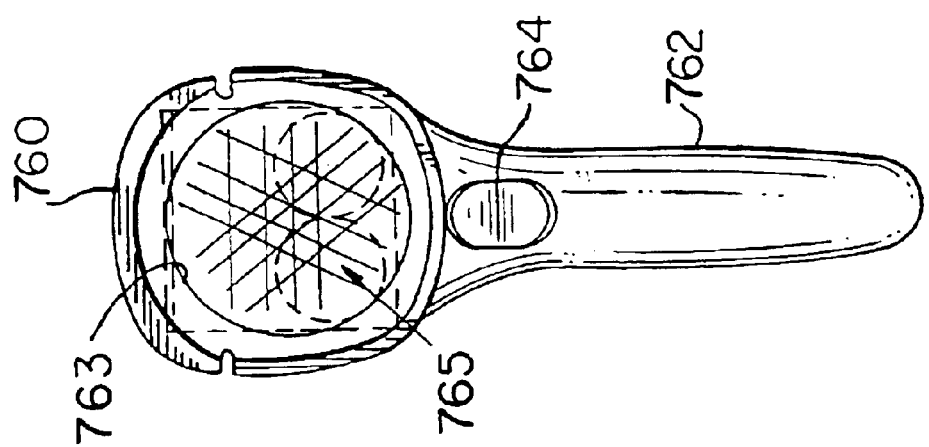
Figure 34:
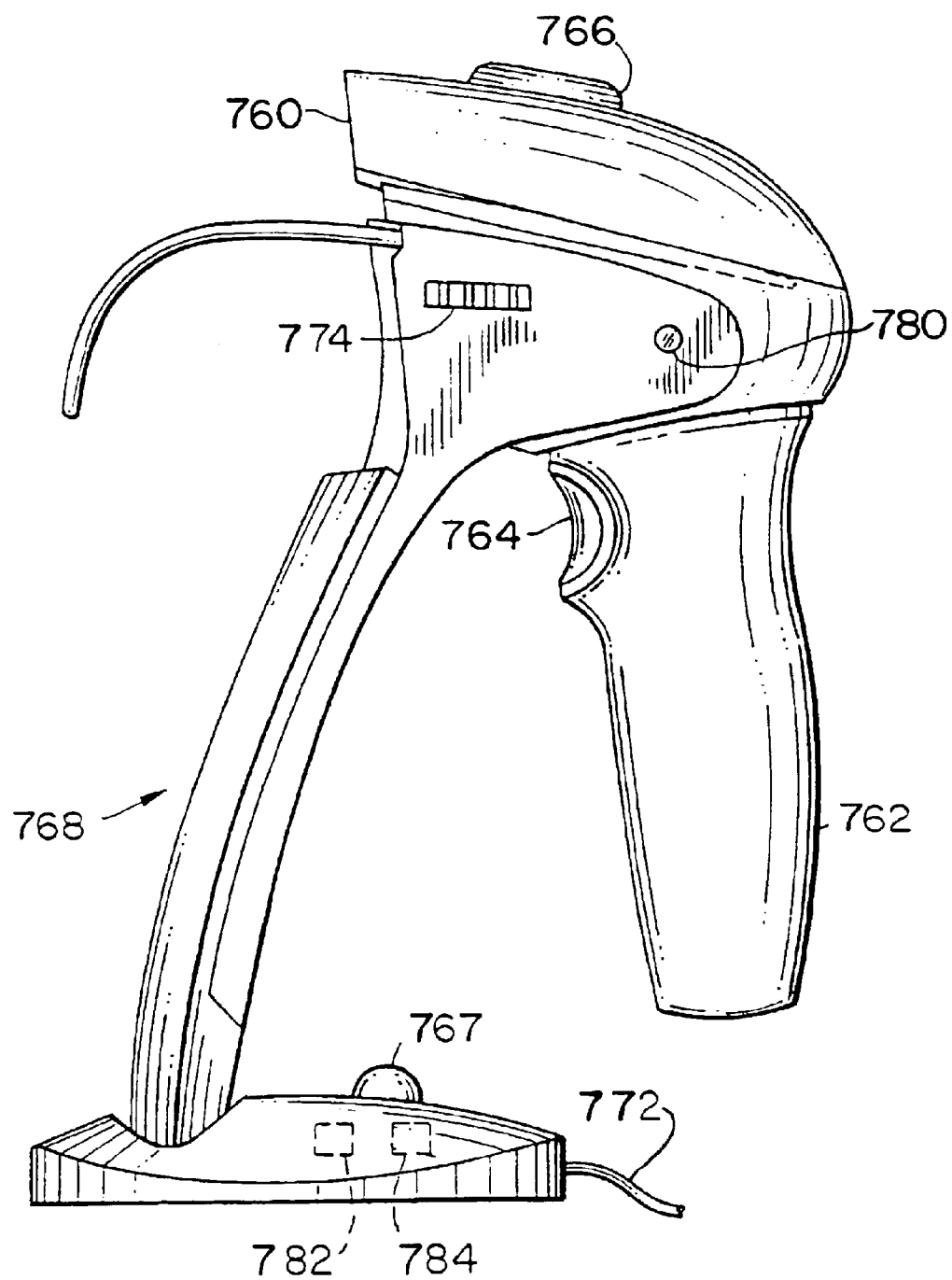
FIG. 34 shows the scanner of FIGS. 32 and 33 in place in its cradle.

FIGS. 32 and 33 show an alternative hand-held portable scanner which is arranged to communicate with a base unit by wireless transmission. The scanner has a head portion 760 and a user-graspable handle portion 762 having a trigger 754. Wireless communication is effected by means of a radio transmitter/receiver 766, which is arranged to communicate with a corresponding radio base unit 767 on a stand 768 (FIG. 34). In use, the scanner communicates with the base unit, which passes information on via wires 772 to a central computer (not shown) for further analysis.

In a busy retail or commercial environment there may be many identical scanners and many identical base units, all in operation at once. Traditionally, each scanner is permanently associated with its own individual base unit. In the embodiment of FIG. 34, however, there is no initial association between the scanner and base unit. A user wishing to perform scans near a particular base unit simply picks up any available scanner from the pool of scanners, and commences scanning operations by first scanning a bar code symbol 774 which has been secured to or printed onto the side of the cradle. The scanner stores and/or processes identification information contained within the symbol. Each cradle/base unit has its own individual bar code symbol, so by scanning the symbol, the user is creating a one-to-one link between scanner and base unit. The operator may now go away from the base unit with the scanner and scan the products as desired. On a successful scan, the radio transmitter 766 sends a message to the receiver 767 on the base unit. The base unit has its own internal processor 782 and decoder 784. If the decoder determines that the scan can be understood, a small loudspeaker 780 in the cradle is actuated, to produce an appropriate "beep". The "beeps" of different base units may have different tones, so that operators can distinguish them if several scanners are in use at once.

In linking a scanner to an individual base unit or cradle only when required, the retailer or system owner need not necessarily maintain the same number of scanners as base units. With such an arrangement, the number of scanners required is not determined by the number of base units, but the number of users that are likely to wish to undertake scanning operations at any one time. The pool of uncommitted scanners has a number of further advantages, including lower maintenance overheads, and the possibility for each user to select a scanner of his or her choice. That may be advantageous if for example some users find it easier to operate one particular model of scanner, and others find it easier to use a different model.

It will be understood that although in FIG. 34 the bar code symbol 774 is shown secured to the side of the cradle, the exact position is in fact immaterial. The bar code symbol could be placed elsewhere on the stand 768, or even elsewhere on the nearby desk, worksurface or checkout station. All that is required is for the symbol 774 to be physically associated in some way, for instance by proximity, with the stand or base unit 768.

The scanner of FIGS. 32 and 33 may be adapted to scan either one-dimensional or two-dimensional indicia. It may incorporate any conventional one or two-dimensional scanning mechanism, such as illustrated in FIG. 43, and may have any convenient one or two-dimensional scanning pattern such as those illustrated in FIGS. 40–42. The stand or base unit 768 may be of a convenient type, such as any of the stands illustrated in FIGS. 27–31. Any other type of stand could of course be used, such as that shown in FIG. 20 of U.S. Pat. No. 5,504,316, assigned to the present assignee. The teaching of that patent is incorporated herein by reference, as is U.S. patent application Ser. No. 09/539,689, filed Mar. 31, 2000.

FIGS. 35–37 illustrate a mechanism for changing the focusing of the outgoing laser beam in an optical scanner. This mechanism may be used in association with any of the embodiments herein disclosed.

A laser diode assembly 900 has, mounted to its front face, a lens holder 902. The lens holder supports a focusing lens 904 within a central of primary aperture 906. In normal use, a laser beam emerges through the lens 904, with the aperture 906 acting as a circular stop to provide a beam of circular cross-section. Such a beam is useful when an omnidirectional scan pattern is to be produced; however, when a single scan line is being used, it is advantageous to use an elliptical laser spot for improved performance on poor quality symbols. This may be achieved in the present embodiment by selectively moving a secondary rectangular aperture 908 into the path of the beam.

To that end, an aperture changing mechanism is provided consisting of a molded plastics material member 910 that may be rotated from a first position, shown in FIG. 36, in which the member is clear of the primary aperture 906; and a second position, shown in FIG. 37, in which the beam is stopped down by the secondary aperture 908. The moving member is mounted to the laser diode assembly 900 on bearings 912, 914. A pivot arm shaft 916 passes through the bearings and has, at its forward end, a shaped aperture plate 918 which has a cut-out to define the aperture 908. To minimize friction and wear at the bearings, the moving parts may be of low-friction material such as Teflon (registered trade mark)—impregnated Delrin (registered trade mark). A magnet 920 mounted to an arm 919 of the plate causes the plate to rotate about the bearings according to current passing through the stationary coil 932. When the current is passed through the coil, the magnet is pulled towards the coil; reversing the current in the coil pushes the magnet away and rotates the plate in the opposite direction. Alternatively, a spring or other biasing device (not shown) could be used to rotate the mechanism in one direction, with the coil being used to rotate it only in the other direction.

In the first position, shown in FIG. 36, a shoulder 924 of the plate abuts a stop or post on the lens holder 902. In the second position, shown in FIG. 37, a side 928 of the plate abuts the stop 926. Preferably, the stop or post 926 is die-cast as an integral part of the lens holder 902.

The aperture 908 may, but need not, carry a further focusing lens.

This allows not only the profile of the laser beam to be altered, but also its focus.

In an alternative arrangement (not shown) movement of the plate 918 could be achieved piezoelectrically, or electrostatically rather than electromechanically.

The mechanism of FIGS. 35–37 will typically be used within a hand-held or fixed optical scanner which is designed for both one-dimensional and for two-dimensional scanning. It is of course necessary to select the proper aperture for the way in which the scanner is to be used. In the preferred scanner, the primary aperture 906 is automatically selected whenever the scanner is in single line mode. Single line mode may be selected manually by the user, or automatically whenever the scanner is lifted out of its stand. In this way, the scanner may be used as a stand-mounted omni-directional presentation scanner and a single line hand-held scanner without requiring the user to operate any controls.

Aperture switching is also useful for extending the usable depth of focus of a scanner beyond that which can be provided by a single aperture. In this case, the secondary aperture is used to provide a near working range and the primary aperture is used to provide more laser power, and to shift the focus further out to provide a far working range. Some means needs to be provided to select the proper aperture (or working range) on any given scan attempt. This can be accomplished in several ways, as follows.

The working range can be selected manually by the user. If he or she desires to scan a symbol far away, he or she can select the far range. If a near symbol is to be scanned, the near range can be selected. The selection can be made by pushing one or two buttons, selecting one of two positions on a two-position trigger switch, and so on.

Figure 44:
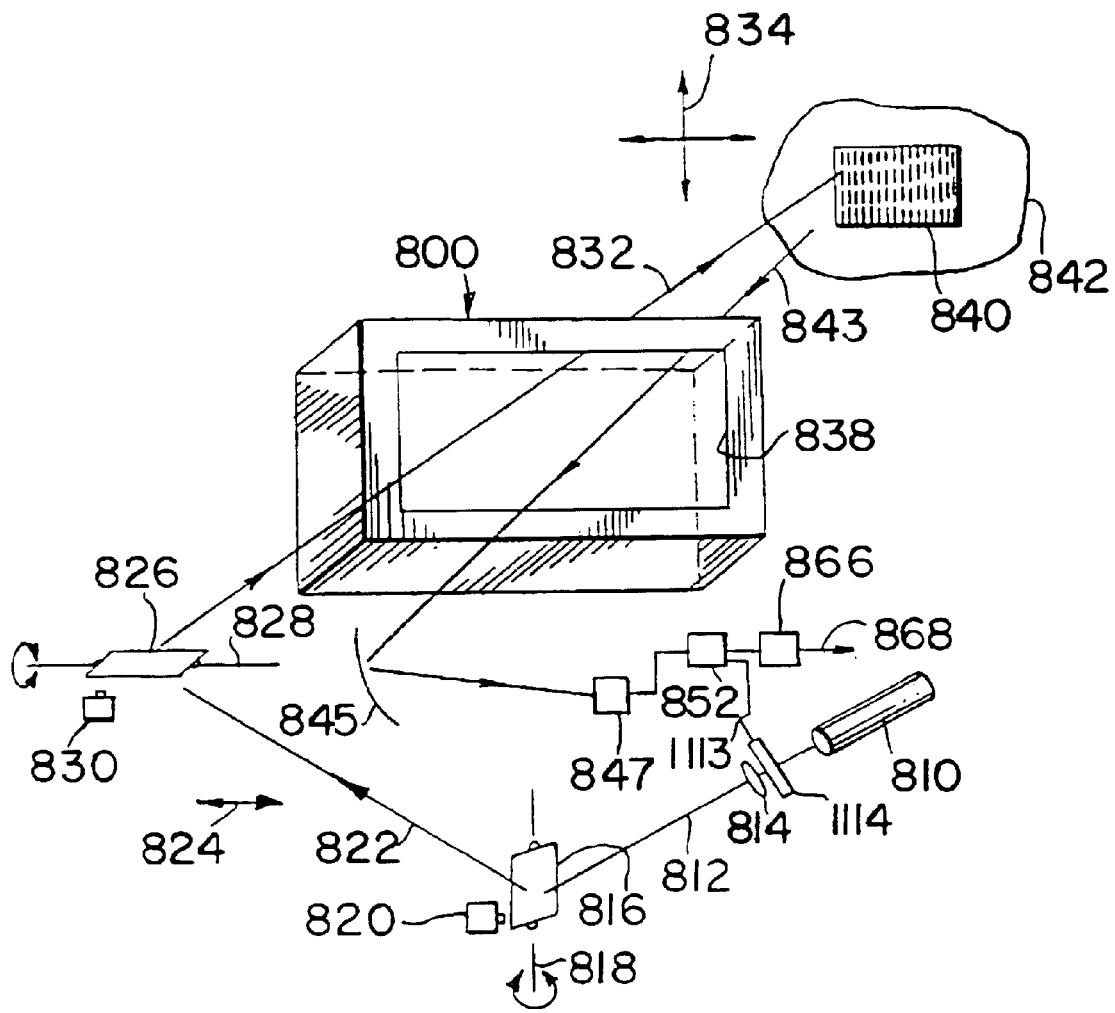
FIG. 44 shows a variation of the internal arrangement of FIG. 43 when used in conjunction with an automatic aperture changing mechanism.

In some circumstances, it would, however, be more desirable for the scanner automatically to select the proper aperture. This eliminates the need for judgement on the user's part, and the time wasted when the wrong aperture is selected. Reference should be made to FIG. 44 which shows schematically how the aperture switching may be controlled in practice. FIG. 44 corresponds to FIG. 43 except for the addition of an aperture/focus switching mechanism 1114 in the outgoing laser beam 812; this may be the mechanism shown in FIGS. 35–37. Control is provided along a line 1113 in response to an output of the digitizer 852, as described in more detail below. The motor 820, 830 may be controlled so that both mirrors scan when one aperture is selected but only one scans when the other is selected.

The scanning system intelligently to select the proper aperture based on analysis of the reflected light signal from the symbol being scanned. If the proper aperture is selected, the depth of modulation of the analog signal will be good enough for the scanner to decode. Depth of modulation can be measured by the scanner e.g. by digitizer. If it is not good enough, the aperture can be switched. Alternatively, the scanner can compare the depth of modulation of two successive scans, each using different apertures. It can determine which of the apertures provides the best modulation. It will then select that aperture for the remainder of the scan attempt. This process, which can be fast enough to be unnoticeable by the scanner user, can be repeated every trigger pull. The scanner can also remember which aperture provided the previous decode and try that one first. Alternatively, it can try the aperture first that provided the largest number of previous decodes.

A scanner with switchable apertures may often be used where some of the symbols to be scanned are very far away. Scanners used to read symbols far away are often provided with an aiming mode that is used to position the laser beam on the symbol before actual scanning is attempted. When in the aiming mode, the scanner usually provides either a stationary laser spot, or moves the spot over an angle that is much less than the normal scan angle. Either of these aiming modes increases the visibility of the laser beam to facilitate aiming. This also helps eliminate accidental scanning of the wrong symbol.

If the aiming mode that moves the beam over a narrow scan angle is used (as opposed to a stationary spot) the aperture selection can be made by examining the signal while the scanner is still in the aiming mode. In this way, the proper aperture can be immediately selected when the scanner switches from aiming mode to scanning mode. A good way to measure the depth of modulation of the analog signal provided by each aperture is as follows:

It is common practice to differentiate the analog signal as a part of the signal processing in many laser scanners. The height of the peaks of the differentiated analog signal are related to the depth of modulation of the analog signal. If the laser is focused to a spot small enough to decode the symbol being scanned, the peaks of the first derivative of the analog signal will all be similar in height. If, on the other hand, the laser is defocused (or if the wrong aperture is selected) there will be large variation in the peak heights. Therefore, if the heights of several peaks are measured, it can be determined if focus is good enough to decode. Alternatively, several peaks can be measured with each aperture. The one with the least variation in peak heights is the one that should be used.

A good way to measure the peaks is as follows. The scanner uses a digitizer that locates the edges to the bars and spaces of the symbol being scanned. This is frequently done by locating the peaks of the first derivative of the analog signal. Therefore, transitions at the output of the digitizer occur at about the same time that the first derivative is near a peak. The transitions occurring at the output of the digitizer can therefore be used to indicate when the peak heights should be measured.

Many inexpensive microprocessors are available today that include an on-chip A to D converter. This converter can sample the first derivative at several neighboring transitions of the analog signal. The depth of modulation of the signal can be determined from the data obtained this way. The microprocessor can then enable the appropriate aperture.

If the depth of modulation is measured during the aiming mode it is unlikely that the system will be fooled by the beam scanning other things other than the bar code symbol that might have features larger than the real bars and spaces. In the aiming mode, the scan line is short enough that it does not extend very far beyond the real symbol.

The microprocessor can be the same one used for decoding if desired. If not, the microprocessor can still be used for other control functions such as trigger sensing, time outs, and so on.

Figure 45:
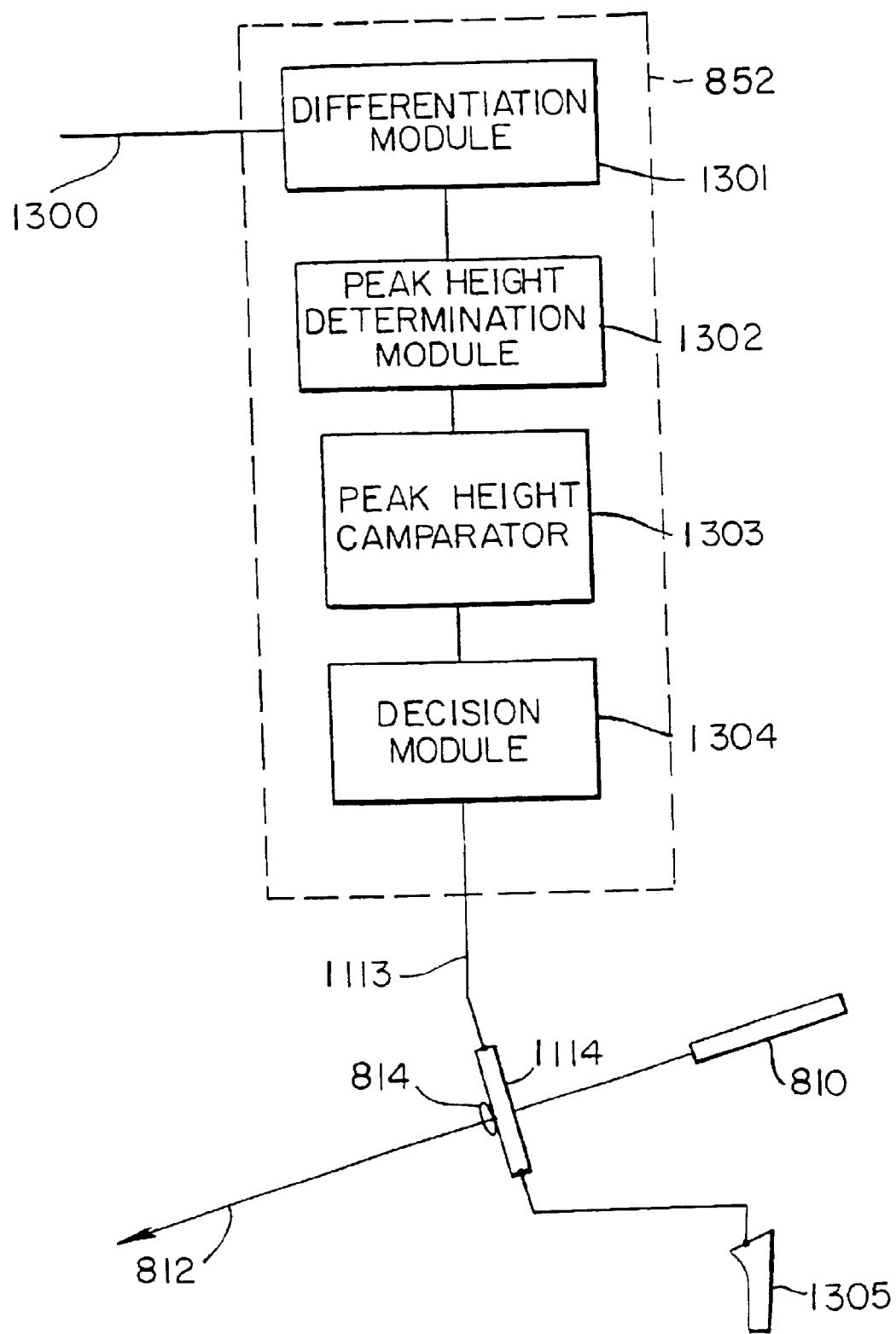
FIG. 45 shows in more detail the control mechanism of the embodiment of FIG. 44.

One particular exemplary embodiment is shown in more detail in FIG. 45. In this figure, identical elements are referred to by the same reference numerals as are used in FIG. 44. The analog signal from the photodetector arrives at the digitizer 852 along a line 1300. The analog signal is differentiated by a differentiation module 1301, and the heights of the peaks within the differentiated signal are then calculated by a peak height determination module 1302. The peak heights are then compared by a peak height comparator 1303, either one with another within the same signal, or alternatively between a first scan using the first aperture and a second scan using the second aperture. The output of the peak height comparator 1303 is passed to a decision module 1304 which issues a control signal along the line 1113 to select the preferred aperture from the aperture/focus switching mechanism 1114.

Alternatively, or in addition, a particular aperture may be chosen manually by means of a two-position trigger switch 1305, manually operable by the user.

Figure 38:
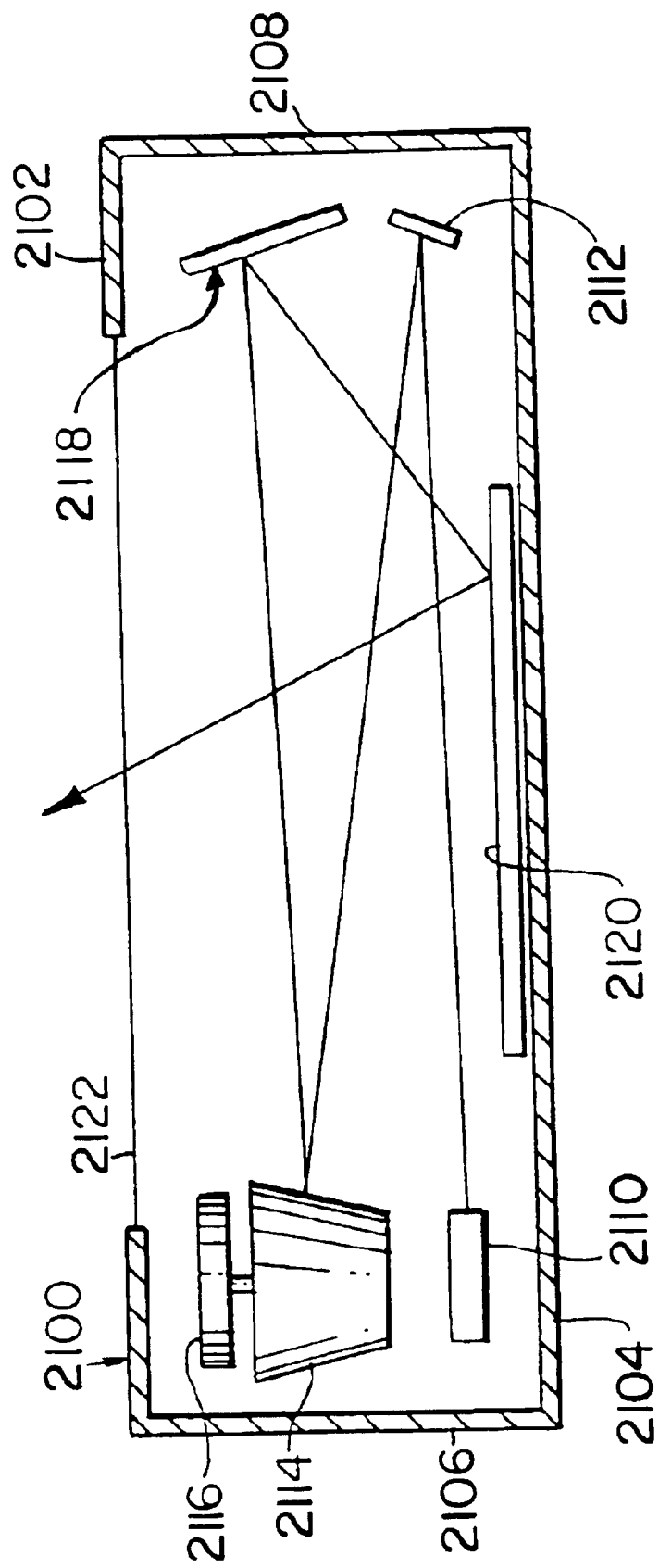
FIG. 38 is a schematic view of a scanner according to a further preferred embodiment of the present invention.

Referring now to FIG. 38, there is shown in schematic form a further scanner embodying the present invention. The scanner includes a compact housing 2000 having front and rear faces 2102, 2104 and side faces 2106, 2108. End faces (not shown in the diagram) are also provided. The depth between the faces 2102, 2104 is 3 inches (7.6 centimeters), the width between the faces 206, 208 is 6 inches (15.2 centimeters) and the length is 5.5 inches (14.0 centimeters).

A laser 2110, preferably a visible laser diode (VLD) emits a beam which travels substantially parallel with the lower surface 2104 of the housing. The beam is then reflected from a small stationary fold mirror 2112 onto a rotating polygonal mirror 2114 which is actuated by an electric motor 2116. The beam is reflected off the polygonal mirror 2114, back across the housing, to a plurality of stationary angled pattern mirrors 2118. The resultant pattern is reflected downwardly, back to the floor of the scanner as shown in the drawing, to a bottom mirror 2120. The pattern reflected off the bottom mirror then passes out of the scanner via a large window 2122.

It will be noted that the stationary pattern mirrors 2118 face generally downwards within the housing, away from the window 2122. This feature, along with the provision of the bottom mirror 2120, provides a long optical path within the scanner, thereby enabling a large scanning pattern to be provided immediately adjacent the window 2122. Since the pattern is large, the window 2122 is also large, and as may be seen takes up most of the area of the face 2102.

Because the window is large, the scanner is ideal for being placed with the window 2122 vertically, on a counter-top. The scan pattern extends very close to the edge of the scanner housing, so that the scanner can sit on top of the counter and the scan pattern will extend down close to the counter-top, where it can intercept symbols near the bottoms of packages sliding past the scanner on the counter-top.

Figure 39:
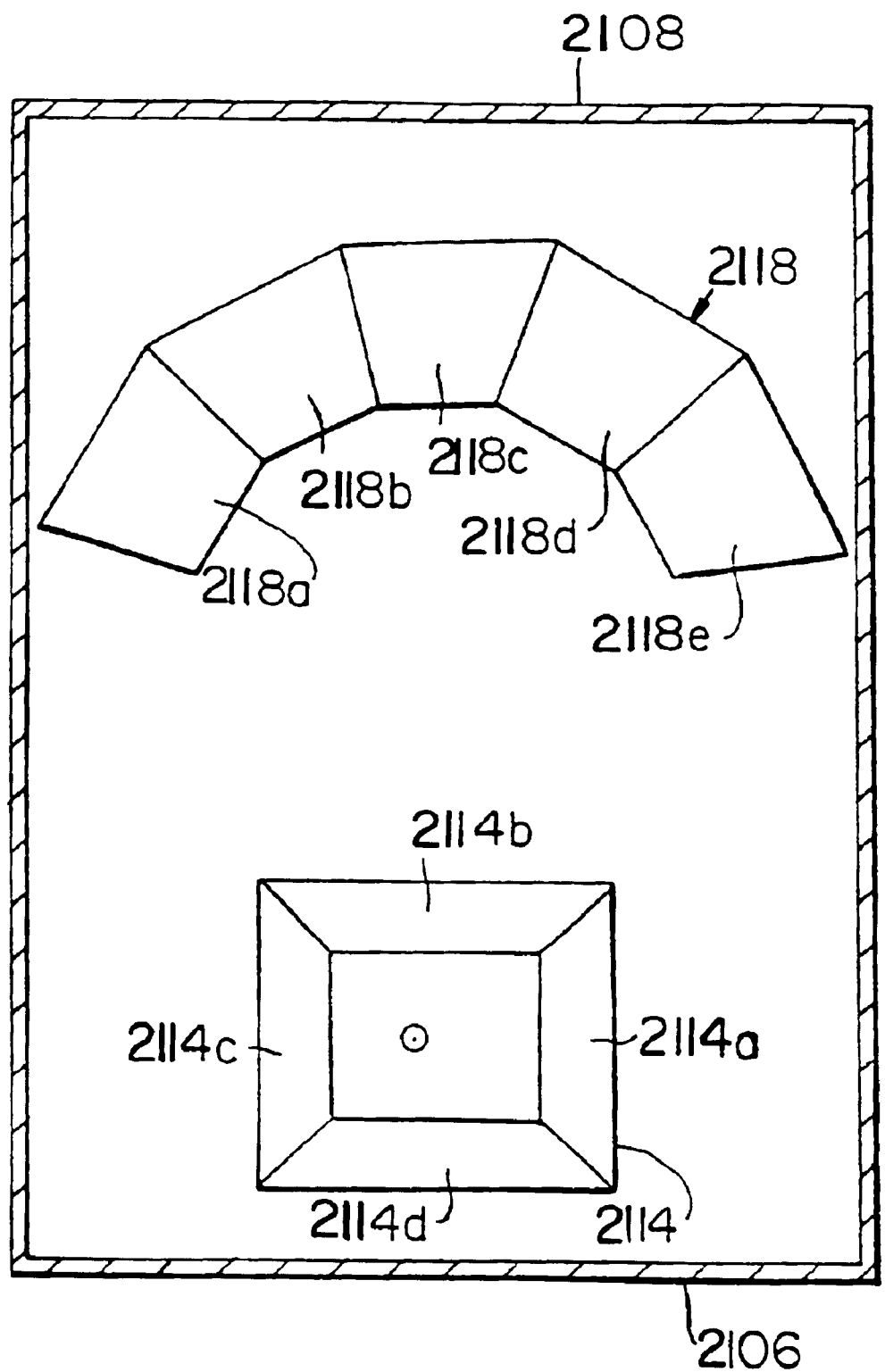
FIG. 39 shows, schematically, the polygonal mirror and the pattern mirrors of the arrangement of FIG. 38, from below.
Figure 40:
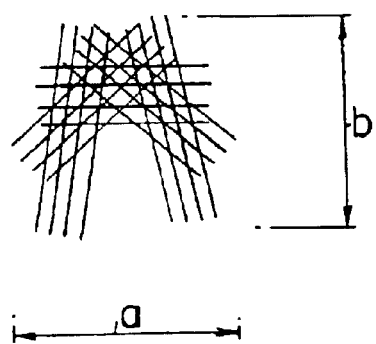
FIGS. 40–42 illustrate preferred scanning patterns.
Figure 41:
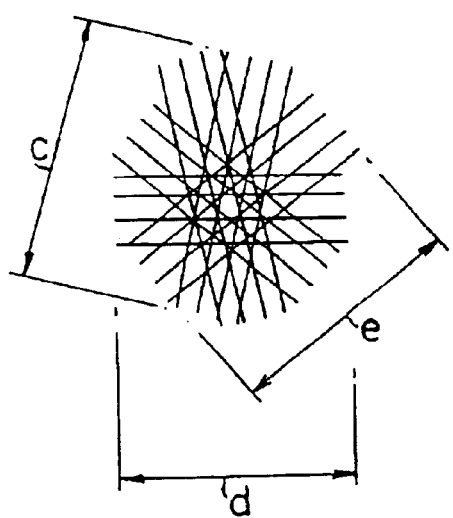
Figure 42:
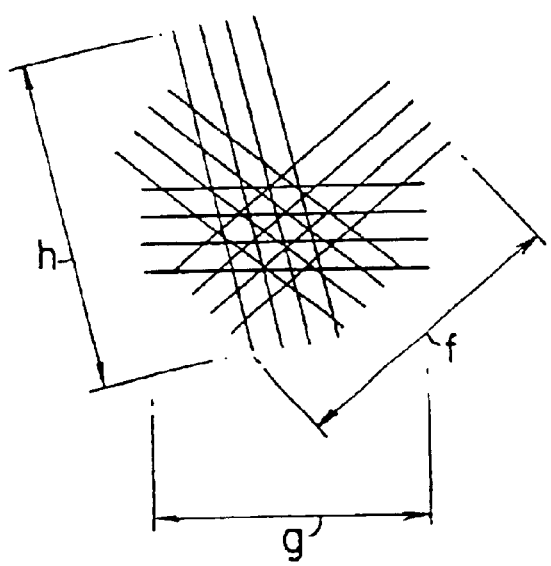

FIG. 39 shows the preferred arrangement of the polygonal mirror 2114 and the pattern mirrors 2118. As will be seen, the polygonal mirror is preferably square in plan view, with four individual mirror facets 2114 *a* to *d*. The pattern mirror 2118 is of half-crown shape, and comprises five angled stationary mirror facets 2118 *a* to *e*. In use, the laser light is directed off of the polygonal mirror 2114, onto the stationary pattern mirrors 2118. After being reflected again from the bottom mirror 2120 (FIG. 38) a scan pattern such as those illustrated in FIGS. 40–42 is produced. The pattern comprises twenty lines in total, which together form a cross-hatch arrangement. As may be seen, each pattern features five line sets of four lines per set, with each line set being positioned approximately 36° from one another. This particular pattern provides dense line coverage both at the face of the scanner and as far out as 8 inches (20 centimeters), thereby reducing the amount of required bar code orientation necessary to intersect a scan line, irrespective of how or at what angle the bar code symbol is presented to the scanner.

FIG. 40 shows the pattern at the window; FIG. 41 shows the pattern at about 3 inches (8 centimeters) from the window; and FIG. 42 shows the pattern at 4.25 inches (10.8 centimeters) from the window. The preferred dimensions are as follows:

a=2.214 inches (5.624 centimeters),
b=1.962 inches (4.983 centimeters),
c=3.6 inches (9.1 centimeters),
d=3.1 inches (7.9 centimeters),
e=3.2 inches (8.1 centimeters),
f=3.9 inches (9.9 centimeters),
g=3.6 inches (9.1 centimeters), and
h=4.6 inches (11.7 centimeters).

It will be appreciated that in other embodiments (not shown) there may be a different number of facets on the polygonal mirror 2114, and there may be a different number of facets on the half-crown stationary pattern mirror 2118.

Figure 46:
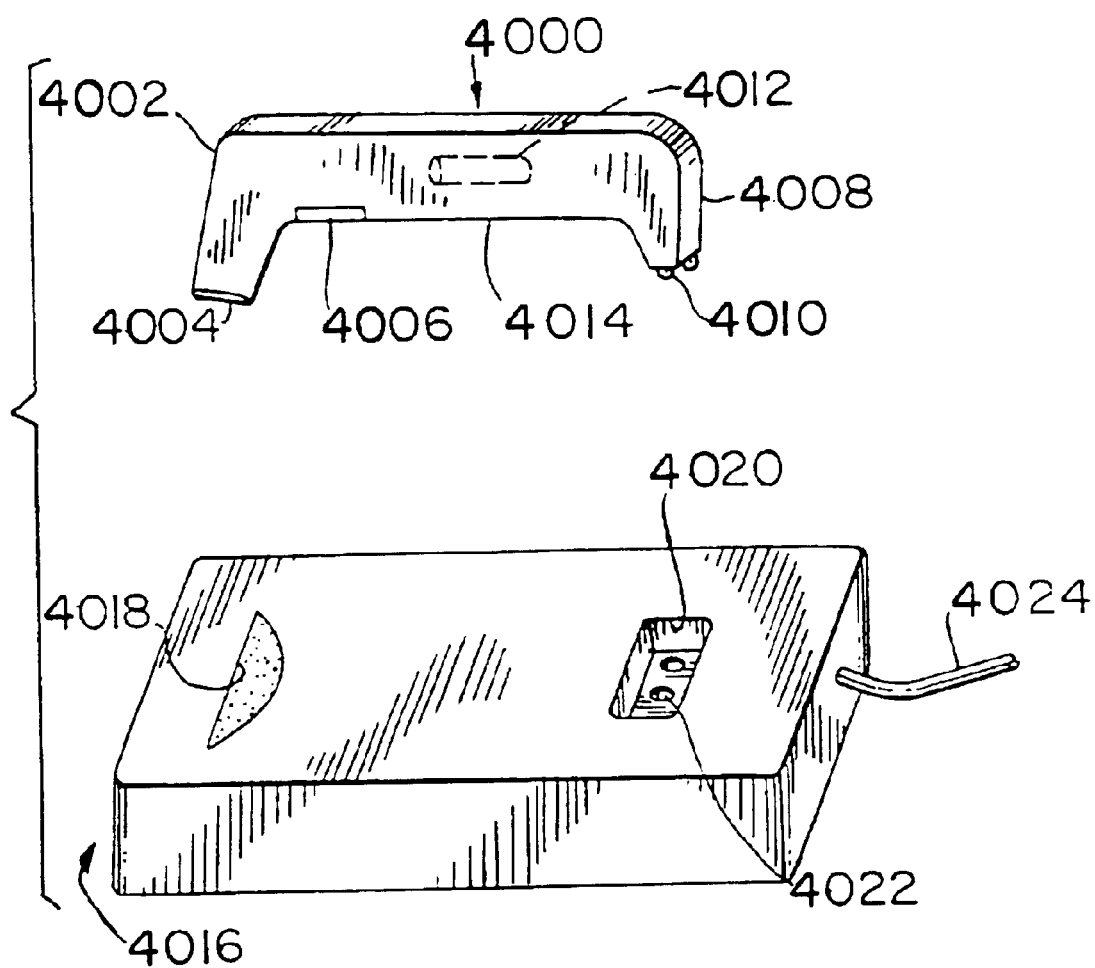
FIG. 46 shows an exemplary charging stand for an optical character reader.

Any or all of the previous embodiments may be battery operated, and may have an associated charging stand on which the scanner is placed when the batteries need to be recharged. The exact configuration of the charging stand of course depends upon the size and shape of the scanner it serves, but one particular embodiment, for use with a telephone-handset shaped scanner 4000, is shown in FIG. 46. The scanner itself includes a head portion 4002, having a window 4004 through which the scanning laser beam passes when actuated by the user by means of a manually operable trigger 4006. The scanner 4000 also includes a foot or tail portion 4008, having electrical contacts 4010 which are coupled to a battery pack 4012 within the main body 4014 of the scanner.

When the scanner is to be charged, it is placed in a charging stand 4016, having a first depression 4018 shaped to take the head portion 4002, and a second depression 4020 shaped to take the tail portion 4008. At the base of the depression 4020 are electrical contacts 4022 which, when the scanner is in place, touch the contacts 4010. Electrical power to the contacts 4022 is provided by a mains power lead 4024.

The charging stand 4016 preferably has a flat base, so that it may be placed in any convenient position on the desk-top by the user. When the user has finished with the scanner, he or she merely places it straight into the stand where it receives a battery recharge without the user needing to make any special arrangements. The stand 4016 acts both as a charger and as a convenient location for the scanner when not in use.

In environments in which static electric charges may represent a hazard, for example on production lines for manufacturing computer memory chips, it may be desirable to manufacture the scanner housing of a static-dissipative material. This could apply to any of the scanners disclosed herein. Preferably, the scanner housing may be manufactured by injection molding, using a polymer alloy having a stainless steel filler to provide electrical conductivity. A suitable substance is ABS (Acrylonitrile-Butadiene-Styrene). A similar material may be used to manufacture the trigger. To prevent static charges from building up on the optical window, the window may be coated with a very thin layer of a transparent charge dissipative material, such as gold.

As previously mentioned, the preferred scanner is a hand-held, omni-directional scanner of the type exemplified by FIGS. 32 and 33. The omni-directional scan pattern changes in size as a function of distance away from the exit window, as depicted in FIGS. 40–42. It has been observed that no matter where the scan pattern is positioned relative to the window in order to optimize reading of the symbol, the user still holds the scanner up close to the window and frequently in contact with the scanner.

Hence, in accordance with another feature of this invention, the optical path and/or the mirror placement within the scanner is designed so that the optimum scan pattern, e.g., that shown in FIG. 41, is located at, or closely adjacent the exit window and, more importantly, the area or size of the optimum scan pattern substantially equals the size or area of a standard symbol to be read. For example, if a one-dimensional UPC symbol to be read measures about 1" (25.4 mm) in length and 9/16" (14.3 mm) in height, then the scan pattern at the window is optimized to have the same dimensions. This is schematically shown in FIG. 33 where the UPC symbol has an area which substantially equals the area of the scan pattern 765 at the exit window 763. In addition, the area of the exit window 763 itself substantially equals the area of the symbol.

Still another feature of this invention relates to moving a pair of parallel scan lines apart from each other during scanning. Thus, as described and illustrated in U.S. Ser. No. 08/542,517, filed Oct. 13, 1995, the entire disclosure of which is hereby incorporated by reference herein, two scan lines which are initially approximately 1/8" (3.175 mm) apart in a narrow-pattern are gradually moved away from each other over the entire height of either a one-dimensional or a two-dimensional symbol to a wide-pattern in which the scan lines are spaced apart approximately 1/2" (12 mm) or more. In the narrow-pattern, the scan lines can be used to enhance the visibility of the scan pattern on the symbol, or to read at least a portion of the symbol. In the wide-pattern the scan lines are used to read the remaining portion of the symbol.

It will be understood that each of the elements described above, or two or more together, also may find a useful application in other types of scanners and bar code readers differing from the types described above.

While the invention has been illustrated and described as embodied in an arrangement for and method of establishing a logical relationship among peripherals in a wireless local area network with low power radio frequency communications, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for establishing a logical relationship among a plurality of peripherals in a wireless local area network managed by a system manager, comprising:
   a) a plurality of readable identifiers respectively supported by the peripherals, each identifier being unique to a respective peripheral; and
   b) a reader for reading the identifiers respectively supported by selected peripherals during a set-up mode of system operation, and having a transceiver in wireless communication with the system manager for identifying the reader and each of the selected peripherals to advise the system manager of the establishment of the logical relationship among the selected peripherals.

2. The arrangement of claim 1, wherein the reader includes a radio frequency transmitter for transmitting the identifiers at radio frequency to the system manager.

3. The arrangement of claim 1, wherein the identifiers are indicia having parts of different light reflectivity, and wherein the reader includes a scanner for electro-optically reading the indicia.

4. The arrangement of claim 3, wherein each identifier includes a tag bearing an electro-optically readable indicium.

5. The arrangement of claim 4, wherein the tag is an adhesive label on each peripheral, and wherein the indicium is a bar code symbol.

6. The arrangement of claim 1, wherein the peripherals are supported on and by a user at discrete locations spaced apart from each other.

7. The arrangement of claim 6, wherein the reader includes a housing supported on a finger of a hand of the user.

8. The arrangement of claim 6, wherein the reader includes an actuator for controlling reading and transmission by the reader.

9. The arrangement of claim 8, wherein the actuator includes a microphone for controlling reading and transmission by voice activation.

10. The arrangement of claim 1, wherein the system manager is operative for generating an acknowledgement signal upon receipt of the identifiers transmitted by the reader; and wherein one of the peripherals is an auditory annunciator spaced from the reader, and being in wireless communication with the system manager, for receiving the acknowledgement signal and, upon receipt thereof, for producing an acknowledgement sound audible to a user and indicative that the system manager received the identifiers transmitted by the reader.

11. A method of establishing a logical relationship among a plurality of peripherals of a local area network managed by a system manager, comprising steps of:
   a) supporting a plurality of readable identifiers by the peripherals, each identifier being unique to a specific peripheral; and
   b) reading the identifiers respectively supported by selected peripherals with a reader during a set-up mode of system operation, and identifying the reader and each of the selected peripherals by wireless communication to the system manager to advise the system manager of the establishment of the logical relationship among the selected peripherals.

12. The method of claim 11, wherein the wireless communication is performed at radio frequency.

13. The method of claim 11, wherein each identifier is an electro-optically readable indicium, and wherein the reading step is performed by an electro-optical reader.

14. The method of claim 13, wherein the indicium is a bar code symbol, and wherein the supporting step is performed by placing the symbol on each peripheral.

15. The method of claim 11; and further comprising the step of supporting the peripherals on a user at different locations spaced apart from each other.

16. The method of claim 11; and further comprising the step of generating an acknowledgment signal upon receipt by the system manager of the identifiers transmitted by the reader, and the step of receiving the acknowledgment signal by an annunciator unit and producing an acknowledgment sound audible to a user and indicative that the system manager received the identifiers transmitted by the reader.

17. A system for electro-optically reading indicia having parts of different light reflectivity, comprising:
   a) an actuatable scanner for scanning the indicia;
   b) a trigger operable by a user, for actuating the scanner to initiate the scanning; and
   c) a biometric sensor on the trigger for authenticating the user.

18. The system of claim 17, wherein the biometric sensor is a fingerprint detector associated with the trigger so that a fingerprint impression is registered when the user presses a surface of the trigger with a finger of the user.

* * * * *